United States Patent
Wang et al.

(10) Patent No.: US 12,028,728 B2
(45) Date of Patent: Jul. 2, 2024

(54) MEASUREMENT METHOD AND APPARATUS

(71) Applicant: HUAWEI TECHNOLOGIES CO., LTD., Guangdong (CN)

(72) Inventors: Rui Wang, Shanghai (CN); Tingting Geng, Shanghai (CN); Hongping Zhang, Shenzhen (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 310 days.

(21) Appl. No.: 17/556,593

(22) Filed: Dec. 20, 2021

(65) Prior Publication Data

US 2022/0116805 A1    Apr. 14, 2022

Related U.S. Application Data

(63) Continuation of application No. PCT/CN2020/096201, filed on Jun. 15, 2020.

(30) Foreign Application Priority Data

Jun. 28, 2019    (CN) .......................... 201910573372.6

(51) Int. Cl.
    *H04W 24/10*       (2009.01)
    *H04W 24/02*       (2009.01)
    *H04W 24/08*       (2009.01)

(52) U.S. Cl.
    CPC ........... *H04W 24/08* (2013.01); *H04W 24/02* (2013.01)

(58) Field of Classification Search
    CPC ..... H04L 5/0096; H04L 5/0057; H04L 5/001; H04L 5/0053; H04W 24/10;
(Continued)

(56) References Cited

U.S. PATENT DOCUMENTS

2012/0309404 A1*   12/2012   Suzuki .............. H04W 56/0045
                                                     455/450
2013/0121204 A1*   5/2013   Lee ........................ H04W 24/10
                                                     370/252
(Continued)

FOREIGN PATENT DOCUMENTS

CN           102186188 A       9/2011
CN           108024269 A       5/2018
(Continued)

OTHER PUBLICATIONS

Office Action issued in Chinese Office Action issued in Chinese Application No. 201910573372.6 dated Aug. 4, 2021, 22 pages (with English translation).

(Continued)

*Primary Examiner* — Jung Liu
(74) *Attorney, Agent, or Firm* — Fish & Richardson P.C.

(57) ABSTRACT

Example measurement methods and apparatus are described. One example method includes obtaining a timer by a terminal device. The terminal device obtains two or more measurement configurations, where each of two or more measurement configurations includes a validity area and a measurement frequency corresponding to the validity area, and the validity area includes one or more cells. The terminal device measures, based on the measurement configuration, a measurement frequency corresponding to a validity area that matches a cell on which the terminal device camps, where the terminal device is in an idle state or in an inactive state, and the timer is not stopped and has not expired.

17 Claims, 10 Drawing Sheets

(58) Field of Classification Search
CPC ......... H04W 52/0229; H04W 72/0453; H04W 76/27; H04W 76/15; H04W 52/365; Y02D 30/70
See application file for complete search history.

(56) References Cited

U.S. PATENT DOCUMENTS

| | | | | |
|---|---|---|---|---|
| 2013/0196650 | A1* | 8/2013 | Futaki | H04W 24/10 455/424 |
| 2014/0200029 | A1* | 7/2014 | Wegmann | H04W 36/0094 455/456.1 |
| 2016/0262118 | A1* | 9/2016 | Kim | H04W 52/365 |
| 2018/0063736 | A1* | 3/2018 | Sadeghi | H04W 72/0446 |
| 2018/0255489 | A1* | 9/2018 | Xu | H04W 36/0083 |
| 2018/0352467 | A1* | 12/2018 | Delsol | H04W 36/0094 |
| 2019/0037425 | A1* | 1/2019 | Hong | H04W 72/23 |
| 2019/0306739 | A1* | 10/2019 | Kim | H04L 5/0096 |
| 2020/0029262 | A1* | 1/2020 | Kim | H04W 74/0833 |
| 2021/0014714 | A1* | 1/2021 | Kim | H04W 76/27 |

FOREIGN PATENT DOCUMENTS

| | | |
|---|---|---|
| CN | 109309969 A | 2/2019 |
| CN | 109644355 A | 4/2019 |
| CN | 109792625 A | 5/2019 |
| CN | 109803278 A | 5/2019 |
| WO | 2013064400 A1 | 5/2013 |

OTHER PUBLICATIONS

PCT International Search Report and Written Opinion issued in International Application No. PCT/CN2020/096201 dated Aug. 31, 2020, 15 pages (with English translation).

Office Action issued in Chinese Application No. 201910573372.6 dated Mar. 18, 2022, 6 pages.

OPPO, "Further Discussion on UE behaviour for Idle Mode Measurement with Validity Area," 3GPP TSG-RAN2 Meeting #102, R2-1806708, Busan, Korea, May 21-25, 2018, 4 pages.

Qualcomm Incorporated, "Discussion on open issues in Idle mode Scell candidate measurement," 3GPP TSG-RAN WG4 Meeting #86bis, R4-1804423, Melbourne, Australia, Apr. 16-20, 2018, 4 pages.

Ericsson, "FFSs regarding early measurement configurations," 3GPP TSG-RAN WG2 #106, R2-1907254, Reno, USA, May 13-17, 2019, 4 pages.

Ericsson, "Handling of idle/inactive measurements during inter-RAT cell reselection," 3GPP TSG-RAN WG2 #105bis, R2-1904482, Xi'an, China, Apr. 8-12, 2019, 3 pages.

Extended European Search Report issued in European Application No. 20833630.5 dated Jun. 3, 2022, 16 pages.

Huawei et al., "Further considerations on validity area," 3GPP TSG-RAN WG2 Meeting #107, R2-1910954, Prague, Czech Republic, Aug. 26-30, 2019, 2 pages.

Vivo, "Validity area for early measurement," 3GPP TSG-RAN WG2 Meeting #106, R2-1905814, Reno, USA, May 13-17, 2019, 3 pages.

* cited by examiner

MEASUREMENT METHOD AND APPARATUS

CROSS-REFERENCE TO RELATED APPLICATIONS

This application is a continuation of International Patent Application No. PCT/CN2020/096201, filed on Jun. 15, 2020, which claims priority to Chinese Patent Application No. 201910573372.6, filed on Jun. 28, 2019. The disclosures of the aforementioned applications are hereby incorporated by reference in their entireties.

TECHNICAL FIELD

Embodiments of this application relate to the field of communication technologies, and in particular, to a measurement method and an apparatus.

BACKGROUND

A dual connectivity (DC) technology and a carrier aggregation (CA) technology can improve spectral efficiency and a user throughput of a system. To enable a terminal device to quickly establish dual connectivity and/or configure carrier aggregation, an existing solution is as follows: When the terminal device is released (Radio Resource Control (RRC) Release or RRC Connection Release) from a connected state (RRC_CONNECTED state) to an idle state (RRC_IDLE state) or an inactive state (RRC_INACTIVE state), the terminal device performs early measurement based on a measurement configuration delivered by a network. Once initiating an access process, the terminal device may report an early measurement result, and the network establishes proper dual connectivity and/or configure carrier aggregation based on the received measurement result.

However, in the existing solution, once the terminal device moves out of a validity area, the terminal device does not perform early measurement.

SUMMARY

Embodiments of this application provide a measurement method and an apparatus, to flexibly configure validity areas, so that a terminal device can quickly establish dual connectivity and/or configure carrier aggregation.

According to a first aspect of the embodiments of this application, a measurement method is provided. The method includes: A terminal device obtains a timer; the terminal device obtains two or more measurement configurations, where each measurement configuration includes a validity area and a measurement frequency corresponding to the validity area, and the validity area includes one or more cells; and when a cell on which the terminal device camps matches the validity area, the terminal device measures the measurement frequency corresponding to the validity area, where the terminal device is in an idle state or in an inactive state, and the timer is not stopped and does not expire. Based on this solution, the terminal device may obtain a plurality of measurement configurations, and the terminal device may measure a measurement frequency corresponding to a validity area that matches the cell on which the terminal device camps. It may be understood that, in this embodiment of this application, validity areas can be flexibly configured. When the cell on which the terminal device camps matches a validity area, a measurement frequency corresponding to the validity area is measured. Compared with a current technology in which a terminal device receives only one early measurement configuration, this embodiment of this application provides the measurement method in which the terminal device can receive a plurality of measurement configurations, so that the terminal device can measure, based on the plurality of measurement configurations, the measurement frequency corresponding to the validity area that matches the cell on which the terminal device camps. Therefore, validity areas can be flexibly configured, and the terminal device can quickly establish dual connectivity and/or configure carrier aggregation.

With reference to the first aspect, in a first possible implementation, validity areas included in different measurement configurations do not completely overlap or do not overlap. Based on this solution, one or more cells included in different validity areas may be partially the same, or may be completely different.

With reference to either of the first aspect or the possible implementation of the first aspect, in another possible implementation, the two or more measurement configurations include a first measurement configuration and a second measurement configuration, the first measurement configuration includes a first validity area and a first measurement frequency corresponding to the first validity area, and the second measurement configuration includes a second validity area and a second measurement frequency corresponding to the second validity area. That the terminal device obtains two or more measurement configurations includes: The terminal device receives the first measurement configuration from a first cell, where the first cell is a cell on which the terminal device camps when the terminal device is released from a connected state; and when a second cell reselected by the terminal device does not match the first validity area, the terminal device continues to run the timer, and the terminal device receives the second measurement configuration from the second cell. Based on this solution, when a cell reselected by the terminal device does not match the first validity area, the terminal device continues to run the timer, and receives a new measurement configuration (the second measurement configuration) from the reselected cell. Compared with the current technology in which when a cell reselected by the terminal device does not match the first measurement configuration received during connection release, the terminal device stops running a timer and does not perform early measurement, this solution provides the method in which when the cell reselected by the terminal device does not match a last received validity area, a new measurement configuration is received from the reselected cell, and early measurement of the terminal device is not stopped because the terminal device continues to run the timer.

Optionally, the validity area may include only a cell on which the terminal device currently camps. For example, the first validity area may include only the first cell on which the terminal device camps when the terminal device is released from the connected state, and the second validity area may include only the second cell. Because the validity area includes only the cell on which the terminal device currently camps, once the terminal device reselects to the second cell from the first cell, the terminal device does not need to determine whether the reselected second cell matches the first validity area, and the terminal device may directly receive the new measurement configuration from the reselected second cell.

With reference to any one of the first aspect or the possible implementations of the first aspect, in another possible implementation, the method further includes: The terminal device stores a measurement configuration that is last received by the terminal device; or the terminal device stores the first measurement configuration and a measurement configuration that is last received by the terminal device. Based on this solution, the terminal device may store only the last received measurement configuration, or may store both the last received measurement configuration and the first measurement configuration that is received from the first cell when the terminal device is released from the connected state. It may be understood that, when the terminal device stores the first measurement configuration and the measurement configuration that is last received by the terminal device, the terminal device always maintains the last received measurement configuration and the first measurement configuration that is sent by a radio access network device when the terminal device is released from the connected state.

With reference to any one of the first aspect or the possible implementations of the first aspect, in another possible implementation, the method further includes: When the terminal device stores the first measurement configuration, and a third cell reselected by the terminal device matches the first validity area, the terminal device measures the first measurement frequency based on the first measurement configuration. Based on this solution, when the terminal device always maintains the first measurement configuration that is sent by the radio access network device when the terminal is released from the connected state, if the terminal reselects to the first validity area again, the terminal device does not need to receive the first measurement configuration, and may directly measure the first measurement frequency based on the first measurement configuration stored by the terminal device.

With reference to any one of the first aspect or the possible implementations of the first aspect, in another possible implementation, the first measurement configuration is carried in radio resource control (RRC) signaling or a system information block (SIB) of the first cell, and the second measurement configuration is carried in a SIB of the second cell. Based on this solution, the terminal device may receive the first measurement configuration from the RRC signaling or the SIB of the first cell, and the terminal device may receive the second measurement configuration from the SIB of the second cell.

With reference to any one of the first aspect or the possible implementations of the first aspect, in another possible implementation, that the terminal device obtains two or more measurement configurations includes: The terminal device receives the two or more measurement configurations from a first cell, where the first cell is a cell on which the terminal device camps when the terminal device is released from a connected state. Based on this solution, the terminal device may receive a plurality of measurement configurations from the first cell.

With reference to any one of the first aspect or the possible implementations of the first aspect, in another possible implementation, that the terminal device measures, based on the measurement configuration, a measurement frequency corresponding to a validity area that matches the cell on which the terminal device camps includes: When a cell on which the terminal device currently camps does not match a validity area included in the two or more measurement configurations, the terminal device suspends measurement, and the terminal device continues to run the timer; and when a fourth cell reselected by the terminal device matches a validity area included in the two or more measurement configurations, the terminal device measures a measurement frequency corresponding to the validity area. Based on this solution, when the cell on which the terminal device camps does not match a validity area included in a plurality of measurement configurations, the terminal device may suspend early measurement and continue to run the timer. The terminal device performs early measurement based on the plurality of measurement configurations when the terminal device reselects to a validity area again. It may be understood that, in this solution, when the terminal device moves out of a validity area, the terminal device continues to run the timer and suspends early measurement, that is, does not perform early measurement temporarily, and the terminal device may continue to perform early measurement when the terminal device moves to the validity area again. This is different from the current technology in which the terminal device stops running the timer and does not perform early measurement when the terminal device moves out of a validity area.

With reference to any one of the first aspect or the possible implementations of the first aspect, in another possible implementation, the two or more measurement configurations are carried in RRC signaling or a SIB of the first cell. Based on this solution, the terminal device may receive the plurality of measurement configurations from the RRC signaling or the SIB of the first cell.

According to a second aspect of the embodiments of this application, a measurement method is provided. The method includes: A radio access network device determines two or more measurement configurations, where each measurement configuration includes a validity area and a measurement frequency corresponding to the validity area, and the validity area includes one or more cells; the radio access network device sends a timer to a terminal device; and the radio access network device sends the two or more measurement configurations to the terminal device via a cell on which the terminal device camps. Based on this solution, the radio access network device may determine a plurality of measurement configurations, and send the timer and the plurality of measurement configurations to the terminal device, so that after receiving the timer, the terminal device is released from a connected state to an idle state or an inactive state, and performs early measurement based on the plurality of measurement configurations.

With reference to the second aspect, in a first possible implementation, validity areas included in different measurement configurations do not completely overlap or do not overlap. Based on this solution, one or more cells included in different validity areas may be partially the same, or may be completely different.

With reference to either of the second aspect or the possible implementation of the second aspect, in another possible implementation, the radio access network device includes a first radio access network device and a second radio access network device, the two or more measurement configurations include a first measurement configuration and a second measurement configuration, the first measurement configuration includes a first validity area and a first measurement frequency corresponding to the first validity area, and the second measurement configuration includes a second validity area and a second measurement frequency corresponding to the second validity area. That the radio access network device sends the two or more measurement configurations to the terminal device via a cell on which the terminal device camps includes: The first radio access network device sends the first measurement configuration to the terminal device via a first cell, where the first cell is a cell on which the terminal device camps when the terminal device is released from the connected state; and the second radio access network device sends the second measurement configuration to the terminal device via a second cell, where the second cell does not match the first validity area, and the second cell matches the second validity area. Based on this solution, the radio access network device may send the different measurement configurations to the terminal device via different cells, so that when the cell on which the terminal device camps does not match a validity area in a last received measurement configuration, the terminal device may receive a new measurement configuration from the camped cell.

With reference to any one of the second aspect or the possible implementations of the second aspect, in another possible implementation, the first measurement configuration is carried in radio resource control RRC signaling or a system information block SIB of the first cell, and the second measurement configuration is carried in a SIB of the second cell. Based on this solution, the radio access network device may send the first measurement configuration by using the RRC signaling or the SIB of the first cell, and the radio access network device may send the second measurement configuration by using the SIB of the second cell.

With reference to any one of the second aspect or the possible implementations of the second aspect, in another possible implementation, that the radio access network device sends the two or more measurement configurations to the terminal device via a cell on which the terminal device camps includes: The radio access network device sends the two or more measurement configurations to the terminal device via a first cell, where the first cell is a cell on which the terminal device camps when the terminal device is released from the connected state. Based on this solution, the radio access network device may send the plurality of measurement configurations to the terminal device via the first cell.

With reference to any one of the second aspect or the possible implementations of the second aspect, in another possible implementation, the two or more measurement configurations are carried in RRC signaling or a SIB of the first cell. Based on this solution, the radio access network device may send the plurality of measurement configurations by using the RRC signaling or the SIB of the first cell.

According to a third aspect of the embodiments of this application, a communication apparatus is provided. The communication apparatus includes a transceiver unit and a processing unit. The transceiver unit is configured to obtain a timer. The transceiver unit is further configured to obtain two or more measurement configurations, where each measurement configuration includes a validity area and a measurement frequency corresponding to the validity area, and the validity area includes one or more cells. The processing unit is configured to: when a cell on which the communication apparatus camps matches the validity area, measure the measurement frequency corresponding to the validity area, where the communication apparatus is in an idle state or in an inactive state, and the timer is not stopped and does not expire.

The communication apparatus may be a terminal or an apparatus used in the terminal, for example, a chip.

With reference to the third aspect, in a first possible implementation, validity areas included in different measurement configurations do not completely overlap or do not overlap.

With reference to either of the third aspect or the possible implementation of the third aspect, in another possible implementation, the two or more measurement configurations include a first measurement configuration and a second measurement configuration, the first measurement configuration includes a first validity area and a first measurement frequency corresponding to the first validity area, and the second measurement configuration includes a second validity area and a second measurement frequency corresponding to the second validity area. The transceiver unit is specifically configured to receive the first measurement configuration from a first cell, where the first cell is a cell on which the communication apparatus camps when the communication apparatus is released from a connected state. When a second cell reselected by the processing unit does not match the first validity area, the processing unit continues to run the timer, and the transceiver unit receives the second measurement configuration from the second cell.

With reference to any one of the third aspect or the possible implementations of the third aspect, in another possible implementation, the communication apparatus further includes a storage unit, where the storage unit is configured to store a measurement configuration that is last received by the transceiver unit; or the storage unit is further configured to store the first measurement configuration and a measurement configuration that is last received by the transceiver unit.

With reference to any one of the third aspect or the possible implementations of the third aspect, in another possible implementation, the processing unit is further configured to: when the storage unit stores the first measurement configuration, and a third cell reselected by the processing unit matches the first validity area, measure, by the processing unit, the first measurement frequency based on the first measurement frequency corresponding to the first validity area in the first measurement configuration.

With reference to any one of the third aspect or the possible implementations of the third aspect, in another possible implementation, the first measurement configuration is carried in radio resource control RRC signaling or a system information block SIB of the first cell, and the second measurement configuration is carried in a SIB of the second cell.

With reference to any one of the third aspect or the possible implementations of the third aspect, in another possible implementation, the transceiver unit is specifically configured to receive the two or more measurement configurations from a first cell, where the first cell is a cell on which the communication apparatus camps when the terminal device is released from a connected state.

With reference to any one of the third aspect or the possible implementations of the third aspect, in another possible implementation, the processing unit is specifically configured to: when a cell on which the communication apparatus currently camps does not match a validity area included in the two or more measurement configurations, suspend, by the processing unit, measurement, and continue to run, by the processing unit, the timer; and when a fourth cell reselected by the communication apparatus matches a validity area included in the two or more measurement configurations, measure, by the processing unit, a measurement frequency corresponding to the validity area.

With reference to any one of the third aspect or the possible implementations of the third aspect, in another possible implementation, the two or more measurement configurations are carried in RRC signaling or a SIB of the first cell.

According to a fourth aspect of the embodiments of this application, a communication apparatus is provided. The communication apparatus includes a transceiver unit and a processing unit. The processing unit is configured to determine two or more measurement configurations, where each measurement configuration includes a validity area and a measurement frequency corresponding to the validity area, and the validity area includes one or more cells. The transceiver unit is configured to send a timer to a terminal device. The transceiver unit is further configured to send the two or more measurement configurations to the terminal device via a cell on which the terminal device camps.

The communication apparatus may be a radio access network device or an apparatus used in the radio access network device, for example, a chip.

With reference to the fourth aspect, in a first possible implementation, validity areas included in different measurement configurations do not completely overlap or do not overlap.

With reference to either of the fourth aspect or the possible implementation of the fourth aspect, in another possible implementation, the two or more measurement configurations include a first measurement configuration and a second measurement configuration, the first measurement configuration includes a first validity area and a first measurement frequency corresponding to the first validity area, and the second measurement configuration includes a second validity area and a second measurement frequency corresponding to the second validity area. In an implementation, when the communication apparatus is used in a first radio access network device, the transceiver unit is specifically configured to send the first measurement configuration to the terminal device via a first cell, where the first cell is a cell on which the terminal device camps when the terminal device is released from a connected state, and the first cell is a cell managed by the first radio access network device and/or a cell within coverage of the first radio access network device. In another implementation, when the communication apparatus is used in a second radio access network device, the transceiver unit is specifically configured to send the second measurement configuration to the terminal device via a second cell, where the second cell does not match the first validity area, the second cell matches the second validity area, and the second cell is a cell managed by the second radio access network device and/or a cell within coverage of the second radio access network device. In still another implementation, when the communication apparatus is used in a first radio access network device, the transceiver unit is specifically configured to: send the first measurement configuration to the terminal device via a first cell, and send the second measurement configuration to the terminal device via a second cell, where the second cell does not match the first validity area, the second cell matches the second validity area, and the first cell and the second cell are cells managed by the first radio access network device and/or cells within coverage of the first radio access network device. The first radio access network device and the second radio access network device may be different radio access network devices. The first radio access network device may be a radio access network device to which a cell belongs, where the cell is a cell on which the terminal camps when the terminal device is released from the connected state. The second radio access network device may be a radio access network device to which a new cell belongs, where the new cell is a cell on which the terminal camps after the terminal that enters an idle state or an inactive state performs cell reselection.

With reference to any one of the fourth aspect or the possible implementations of the fourth aspect, in another possible implementation, the first measurement configuration is carried in RRC signaling or a SIB of the first cell, and the second measurement configuration is carried in a SIB of the second cell.

With reference to any one of the fourth aspect or the possible implementations of the fourth aspect, in another possible implementation, the transceiver unit is specifically configured to send the two or more measurement configurations to the terminal device via a first cell, where the first cell is a cell on which the terminal device camps when the terminal device is released from a connected state.

With reference to any one of the fourth aspect or the possible implementations of the fourth aspect, in another possible implementation, the two or more measurement configurations are carried in RRC signaling or a SIB of the first cell.

For effect descriptions of the third aspect and various implementations of the third aspect, refer to the corresponding effect descriptions of the first aspect and various implementations of the first aspect. For effect descriptions of the fourth aspect and various implementations of the fourth aspect, refer to the corresponding effect descriptions of the second aspect and various implementations of the second aspect. Details are not described herein again.

According to a fifth aspect of the embodiments of this application, a computer storage medium is provided. The computer storage medium stores computer program code. When the computer program code is run on a processor, the processor is enabled to perform the measurement method according to any one of the foregoing aspects.

According to a sixth aspect of the embodiments of this application, a computer program product is provided. The program product stores computer software instructions executed by the foregoing processor. The computer software instructions include a program used to perform the solutions in the foregoing aspects.

According to a seventh aspect of the embodiments of this application, a communication apparatus is provided. The apparatus includes a processor, and may further include a transceiver and a memory. The transceiver is configured to send and receive information, or is configured to communicate with another network element. The memory is configured to store computer-executable instructions. The processor is configured to execute the computer-executable instructions, to support a terminal device or a radio access network device in implementing the measurement method according to any one of the foregoing aspects.

According to an eighth aspect of the embodiments of this application, a communication apparatus is provided. The apparatus may exist in a product form of a chip. A structure of the apparatus includes a processor, and may further include a memory. The memory is configured to: be coupled to the processor, and store program instructions and data that are necessary for the apparatus. The processor is configured to execute the program instructions stored in the memory, to support a terminal device or a radio access network device in performing the method according to any one of the foregoing aspects.

According to a ninth aspect of the embodiments of this application, a communication apparatus is provided. The apparatus may exist in a product form of a chip. A structure of the apparatus includes a processor and an interface circuit. The processor is configured to communicate with another apparatus through a receiving circuit, to enable the apparatus to perform the method according to any one of the foregoing aspects.

According to a tenth aspect of the embodiments of this application, a communication system is provided. The system includes a terminal and a radio access network device. The terminal may perform the method according to the first aspect, and the radio access network device may perform the method according to the second aspect.

DESCRIPTION OF EMBODIMENTS

Figure 1:
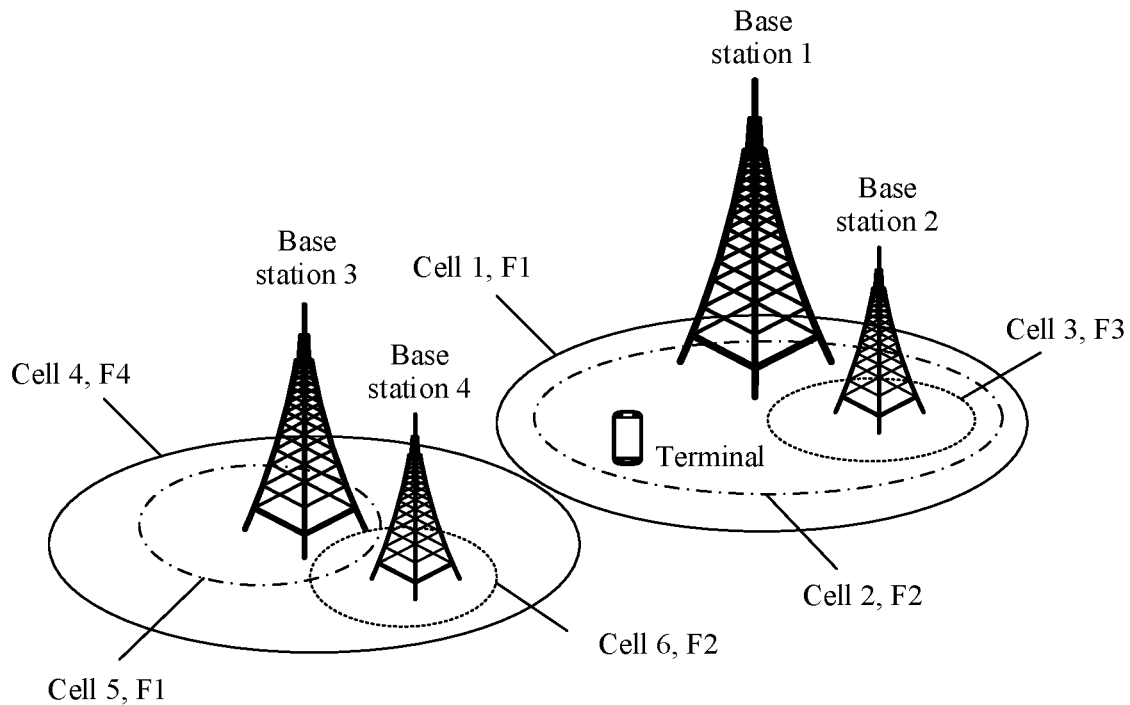
FIG. 1 is a schematic diagram of a communication scenario according to an embodiment of this application.

The following describes the technical solutions in the embodiments of this application with reference to the accompanying drawings in the embodiments of this application.

In this application, a terminal may be a device of various types that provides a user with voice and/or data connectivity, for example, may be a handheld device that has a wireless connection function, or a processing device connected to a wireless modem. The terminal may communicate with a core network by using an access network such as a radio access network (RAN), and exchange voice and/or data with the RAN. The terminal may include user equipment (UE), a wireless terminal, a mobile terminal, a subscriber unit, a subscriber station, a mobile station, a remote station, an access point (AP), a remote terminal, an access terminal, a user terminal, a user agent, a user device, or the like. The terminal may include, for example, a mobile phone (or referred to as a "cellular" phone), a computer with a mobile terminal, a portable, pocket-sized, handheld, computer built-in, or vehicle-mounted mobile apparatus, or a smart wearable device. For example, the terminal is a device such as a personal communication service (PCS) phone, a cordless phone, a session initiation protocol (SIP) phone, a wireless local loop (WLL) station, a personal digital assistant (PDA), a smart band, or a smart watch. The terminal device further includes a limited device, for example, a device having low power consumption, a device having a limited storage capability, or a device having a limited computing capability. For example, the terminal device includes an information sensing device, for example, a barcode, a radio frequency identification (RFID) device, a sensor, a global positioning system (GPS), or a laser scanner. In addition, the terminal may alternatively be an unmanned aerial vehicle device. In the embodiments of this application, a chip used in the foregoing device may also be referred to as a terminal.

A communication system in this application may be a long term evolution (LTE) wireless communication system, a 5th generation (5G) mobile communication system such as a new radio (NR) system, or another next generation (NG) communication systems, or the like. This is not limited in this application.

In this application, a radio access network device may be a base station defined in the 3rd generation partnership project (3GPP). For example, the radio access network device may be a base station device in the LTE system, namely, an evolved Node B (eNB/eNodeB), or may be an access network side device in the NR system, including a gNodeB (gNB), a transmission point (TRP), and the like. The radio access network device may include a centralized unit (CU) and a distributed unit (DU). The CU may also be referred to as a control unit. A CU-DU structure may be used to split protocol layers of a base station. Functions of some protocol layers are distributed in the CU for centralized control, and functions of some or all of remaining protocol layers are distributed in the DU. The CU centrally controls the DU. In addition, when the eNB accesses an NR core network, which may be referred to as a next generation core network (NGC) or a 5G core network (5GC), an LTE eNB may also be referred to as an eLTE eNB. Specifically, the eLTE eNB is an evolved LTE base station device based on the LTE eNB, and may be directly connected to the 5G core network (CN). The eLTE eNB also belongs to a base station device in NR. The access network device 101 or the access network device 102 may alternatively be a wireless terminal (WT), for example, an access point (AP), an access controller (AC), or another network device, for example, a relay device, a vehicle-mounted device, or an intelligent wearable device, that has a capability of communicating with a terminal and the core network. A type of a network device is not limited in the embodiments of this application.

In this application, "at least one" refers to one or more, and "a plurality of" refers to two or more. "And/or" describes an association relationship between associated objects, and represents that three relationships may exist. For example, A and/or B may represent the following cases: Only A exists, both A and B exist, and only B exists, where A and B may be singular or plural. The character "/" usually represents an "or" relationship between the associated objects. "At least one of the following items (pieces)" or a similar expression thereof means any combination of these items, including any combination of singular items (pieces) or plural items (pieces). For example, at least one (piece) of a, b, or c may represent: a, b, c, a-b, a-c, b-c, or a-b-c, where a, b, and c may be singular or plural. In addition, to clearly describe the technical solutions in the embodiments of this application, terms such as "first" and "second" are used in the embodiments of this application to distinguish between same items or similar items that provide basically same functions or purposes. A person skilled in the art may understand that the terms such as "first" and "second" do not limit a quantity and an execution sequence.

It should be noted that, in this application, terms such as "example" or "for example" are used to represent giving an example, an illustration, or descriptions. Any embodiment or design scheme described as an "example" or "for example" in this application should not be explained as being more preferred or having more advantages than another embodiment or design scheme. Specifically, use of "example" or "for example" is intended to present a relative concept in a specific manner.

Descriptions such as "first" and "second" in the embodiments of this application are merely used for indicating and distinguishing between described objects, do not show a sequence, do not indicate a specific limitation on a quantity of devices in the embodiments of this application, and do not constitute any limitation on the embodiments of this application.

In the embodiments of this application, "connection" means various connection manners such as a direct connection or an indirect connection, for implementing communication between devices. This is not limited in the embodiments of this application.

Unless otherwise specified, "transmission" (transmit/transmission) in the embodiments of this application refers to bidirectional transmission, and includes a sending action and/or a receiving action. Specifically, "transmission" in the embodiments of this application includes data sending, data receiving, or data sending and receiving. That is, data transmission herein includes uplink data transmission and/or downlink data transmission. Data may include a channel and/or a signal. Uplink data transmission is uplink channel transmission and/or uplink signal transmission, and downlink data transmission is downlink channel transmission and/or downlink signal transmission.

In the embodiments of this application, a "network" and a "system" express a same concept, and a communication system is a communication network.

For example, when a user makes a call with a terminal device of another user by using the terminal device, the terminal device is in a connected state. After the user ends the call and locks a screen, the terminal device receives an RRC connection release message sent by a network device, and the terminal device is released from the connected state to an idle state or an inactive state. When the terminal device enters the connected state again, the terminal device may have a large amount of service data that needs to be transmitted. To enable the terminal device to quickly establish dual connectivity and/or configure carrier aggregation, and improve data transmission efficiency, the terminal device may perform early measurement based on a measurement configuration delivered by a radio access network device. Once initiating an access process, the terminal device may report an early measurement result, and the network establishes proper dual connectivity and/or configure carrier aggregation based on the received measurement result. The early measurement is measurement performed before the terminal device enters the connected state.

For example, as shown in FIG. 1, a cell 1 on a frequency F1 and a cell 2 on a frequency F2 are deployed in a base station 1. A cell 3 that is on a frequency F3 and that has small coverage is deployed in a base station 2. The base station 1 may establish a dual connection to the base station 2. A cell 4 on a frequency F4 and a cell 5 on the frequency F1 are deployed in a base station 3. A cell 6 on the frequency F2 is deployed in a base station 4. The base station 3 may establish a dual connection to the base station 4. Because coverage of the base stations is different, the base station 1 cannot establish dual connections to the base stations 3 and 4, and the base station 2 cannot establish dual connections to the base stations 3 and 4.

For example, when the terminal device is released from the connected state, a cell on which the terminal device camps is the cell 2 on the frequency F2. After the terminal device receives radio resource control (RRC) signaling sent by the radio access network device, the terminal device is released from the connected state to the idle state or the inactive state. The RRC signaling may carry a timer and an early measurement configuration, where the early measurement configuration includes a validity area and measurement frequencies. For example, the validity area in the early measurement configuration is {(F1, cell 1), (F2, cell 2), (F3, cell 3)}, and the measurement frequencies include the F1, the F2, and the F3. When the terminal device receives the timer sent by the network side, the terminal device starts the timer. If a cell on which the terminal device camps is the cell 2 shown in FIG. 1, the terminal device matches the cell (cell 2) on which the terminal device currently camps with the validity area. Because the cell 2 in FIG. 1 is a cell in a list of validity areas configured on the network side, the cell (cell 2) on which the terminal device currently camps matches the validity area, and the terminal device may perform early measurement on the measurement frequencies F1, F2, and F3. However, once the terminal device reselects to the cell 4 (or the cell 5, or the cell 6) in FIG. 1, because the cell 4 (or the cell 5, or the cell 6) does not match the validity area configured on the network side, the terminal device stops running the timer, and the terminal device does not perform early measurement.

To resolve a problem that once the terminal device moves out of the validity area, the terminal device does not perform early measurement, the embodiments of this application provide a measurement method, to flexibly configure validity areas, so that the terminal device can quickly establish dual connectivity and/or configure carrier aggregation.

Figure 2:
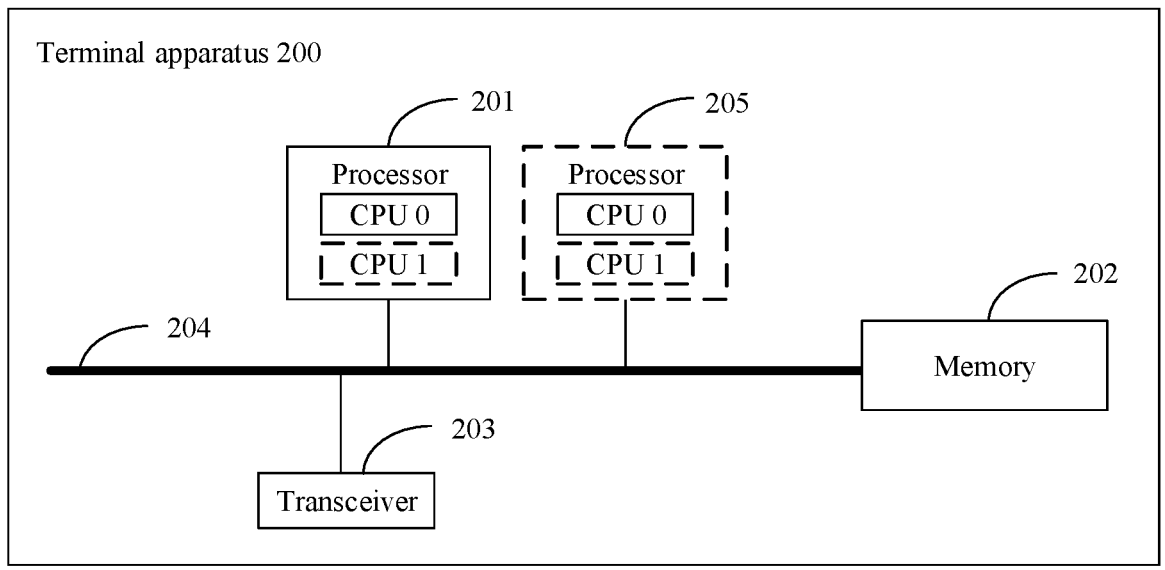
FIG. 2 is a schematic diagram of a structure of a terminal apparatus according to an embodiment of this application.

For example, the measurement method provided in the embodiments of this application may be applied to a terminal apparatus shown in FIG. 2. The terminal apparatus may be a chip, an apparatus used in a terminal, or a terminal device.

As shown in FIG. 2, the terminal apparatus 200 includes at least one processor 201, a memory 202, a transceiver 203, and a communication bus 204.

The following describes the components of the terminal apparatus 200 in detail with reference to FIG. 2.

The processor 201 is a control center of the terminal apparatus 200, and may be one processor or may be a collective term of a plurality of processing elements. For example, the processor 201 may be a central processing unit (CPU) or an application-specific integrated circuit (ASIC), or may be configured as one or more integrated circuits implementing the embodiments of the present invention, for example, one or more microprocessors (digital signal processors, DSPs) or one or more field programmable gate arrays (FPGAs).

The processor 201 may perform various functions of the communication device by running or executing a software program stored in the memory 202 and invoking data stored in the memory 202.

During specific implementation, in an embodiment, the processor 201 may include one or more CPUs, for example, a CPU 0 and a CPU 1 shown in FIG. 2.

During specific implementation, in an embodiment, the communication device may include a plurality of processors, for example, the processor 201 and a processor 205 shown in FIG. 2. Each of the processors may be a single-core processor (single-CPU) or may be a multi-core processor (multi-CPU). The processor herein may be one or more communication devices, circuits, and/or processing cores configured to process data (for example, computer program instructions).

The memory 202 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc), a magnetic disk storage medium or another magnetic storage device, or any other medium that can be used to carry or store expected program code in a form of instructions or a data structure and that can be accessed by a computer, but is not limited thereto. The memory 202 may exist independently and is connected to the processor 201 through the communication bus 204. Alternatively, the memory 202 may be integrated with the processor 201.

The memory 202 is configured to store a software program for executing solutions of the present invention, and the processor 201 controls execution of the software program.

The transceiver 203 is configured to communicate with another communication device. Certainly, the transceiver 203 may be further configured to communicate with a communication network, such as the Ethernet, a radio access network (RAN), or a wireless local area network (WLAN). The transceiver 203 may include a receiving unit for implementing a receiving function and a sending unit for implementing a sending function.

The communication bus 204 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 2, but this does not mean that there is only one bus or only one type of bus.

The structure shown in FIG. 2 does not constitute a limitation on the terminal apparatus. The terminal apparatus 200 may include more or fewer components than those shown in the figure, or combine some components, or have different component arrangements.

Figure 3:
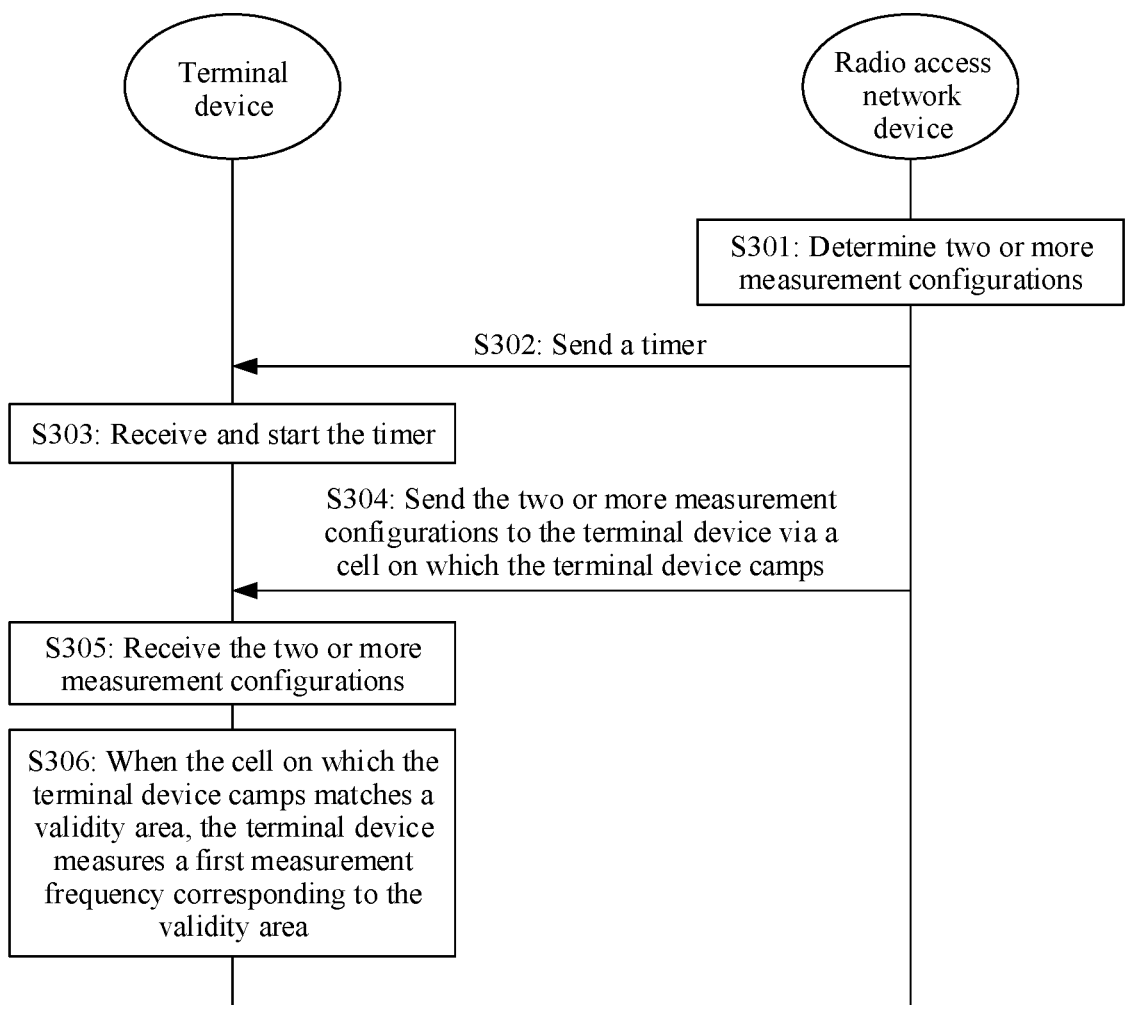
FIG. 3 is a schematic flowchart of a measurement method according to an embodiment of this application.

FIG. 3 shows a measurement method according to an embodiment of this application. As shown in FIG. 3, the measurement method may include steps S301 to S306.

S301: A radio access network device determines two or more measurement configurations, where each measurement configuration includes a validity area and a measurement frequency corresponding to the validity area.

For example, the validity area may include one or more cells. The validity area may be a list of cells. The list of cells includes one or more cells, and the one or more cells form the validity area. For example, each cell in the list of cells may be represented by a physical cell identifier (PCI). A value range of a PCI of a cell on each frequency is 0 to 503. To distinguish PCIs of different cells, a cell in the validity area can be represented by a PCI of the cell on a frequency. For example, as shown in FIG. 1, the cell 1 on the frequency F1 may be denoted as (F1, cell 1).

For example, a measurement frequency may be included in a list of measurement frequencies, and the list of measurement frequencies may include one or more measurement frequencies.

For example, the radio access network device may be a base station, or a device in a network that provides radio access. This is not limited in this embodiment of this application. In this embodiment of this application, only an example in which the radio access network device is a base station is used for description.

For example, that a radio access network device determines two or more measurement configurations may include: The radio access network device determines a combination of frequencies on which a terminal device may establish DC and/or CA; or the radio access network device exchanges messages with another access network device through an interface, and determines a combination of frequencies on which a terminal device may establish DC and/or CA. The radio access network device determines a list of measurement frequencies in the measurement configuration based on the combination of frequencies on which the terminal device may establish DC and/or CA, and then determines a validity area based on a valid range of the list of measurement frequencies. Optionally, that the radio access network device determines a validity area based on a valid range of the list of measurement frequencies may include: The radio access network device estimates a movement range of the terminal device in an idle state or in an inactive state, and determines the validity area in the measurement configuration. A specific method used by the radio access network device to determine the two or more measurement configurations is not limited in this embodiment of this application, and is merely an example for description herein.

Optionally, the two or more measurement configurations may be determined by one radio access network device, or may be determined by a plurality of radio access network devices. This is not limited in this embodiment of this application.

Optionally, validity areas included in different measurement configurations do not completely overlap or do not overlap. That is, one or more cells included in the validity areas included in the different measurement configurations may be partially the same, or may be completely different.

S302: The radio access network device sends a timer to the terminal device.

The timer is a timer used by the terminal device to perform early measurement. When the timer is stopped or expires, the terminal device does not need to perform early measurement.

The timer may be carried in dedicated signaling, and the dedicated signaling may be RRC signaling, for example, RRC Release or RRC Connection Release. For example, the radio access network device sends the RRC signaling to the terminal device, where the RRC signaling carries the timer. After receiving the RRC signaling, the terminal device is released from a connected state to the idle state or the inactive state.

S303: The terminal device receives and starts the timer.

For example, after receiving the timer delivered by the radio access network device, the terminal device starts the timer. It may be understood that after the timer is started, the terminal device may perform early measurement.

For example, that the terminal device receives the timer may include: The terminal device receives the RRC signaling sent by the radio access network device, and the terminal device starts the timer, and is released from the connected state to the idle state or the inactive state.

S304: The radio access network device sends the two or more measurement configurations to the terminal device via a cell on which the terminal device camps.

For example, the two or more measurement configurations may be delivered by one radio access network device via one cell, or may be delivered by different radio access network devices or a same radio access network device via different cells. This is not limited in this embodiment of this application.

For example, the cell on which the terminal device camps may be a cell on which the terminal device camps when the terminal device is released from the connected state, or may be a cell on which the terminal device camps after the terminal device moves and performs cell reselection. For example, the terminal device camps on a cell A when the terminal device is released from the connected state, and then camps on a cell B after the terminal device performs cell reselection. In other words, the cell A and the cell B are successively used as the cell on which the terminal device camps.

In an implementation, the two or more measurement configurations may be carried in RRC signaling of a first cell together with the timer, or the two or more measurement configurations may be independently carried in a system information block (SIB) of the first cell. This is not limited in this embodiment of this application. The first cell is a cell on which the terminal device camps when the terminal device is released from the connected state. For example, when the two or more measurement configurations are carried in the RRC signaling of the first cell, because the timer is also carried in the RRC signaling of the first cell, the foregoing steps S302 and S304 may be combined into one step. That is, the radio access network device sends the RRC signaling to the terminal device via the first cell, where the RRC signaling carries the timer and the two or more measurement configurations.

In another implementation, one of the two or more measurement configurations may be carried in RRC signaling of a first cell together with the timer, or one of the two or more measurement configurations may be independently carried in a system information block (SIB) of the first cell. The other measurement configurations in the two or more measurement configurations are carried in a SIB of a second cell, and the second cell is a cell other than the first cell.

S305: The terminal device receives the two or more measurement configurations.

For example, the terminal device may receive the two or more measurement configurations from one cell, or may receive the two or more measurement configurations from different cells. This is not limited in this embodiment of this application. For example, the terminal device may receive the two or more measurement configurations from the cell on which the terminal device camps when the terminal device is released from the connected state. For another example, the terminal device may receive the two measurement configurations from different cells. Specifically, the terminal may obtain one measurement configuration from the cell on which the terminal device camps when the terminal device is released from the connected state. Then, after performing cell reselection, the terminal device may obtain another measurement configuration from a cell on which the terminal device currently camps.

Optionally, the terminal device may store the two or more measurement configurations. For example, the terminal device may locally store the two or more measurement configurations. For example, the terminal device may store the two or more measurement configurations in a local variable, and the local variable may be VarMeasIdleConfig. The variable may include the timer and a first measurement configuration, or may include only the first measurement configuration. This is not limited in this embodiment.

S306: When the cell on which the terminal device camps matches a validity area, the terminal device measures a first measurement frequency corresponding to the validity area.

The terminal device is in the idle state or in the inactive state. It may be understood that in this embodiment of this application, after the terminal device receives the RRC signaling sent by the radio access network device, the terminal device is released from the connected state to the idle state or inactive state. Therefore, measurement performed by the terminal device on the measurement frequency is early measurement performed before the terminal device enters the connected state. It may be understood that each time of measurement in this embodiment is early measurement performed before the terminal device enters the connected state.

For example, the cell on which the terminal device camps in step S306 may include a cell selected by the terminal device or a cell reselected by the terminal device, for example, the cell on which the terminal device camps when the terminal device is released from the connected state, or the cell on which the terminal device camps after the terminal device performs reselection, where the cell on which the terminal device camps after the terminal device performs reselection matches a validity area.

For example, when the terminal device determines that the cell on which the terminal device camps matches the validity area, the terminal device may measure a measurement frequency corresponding to the validity area. For example, as shown in FIG. 1, the cell on which the terminal device camps is the cell on which the terminal device camps when the terminal device is released from the connected state, namely, the cell 2 on the frequency F2. Because the cell on which the terminal device camps when the terminal device is released from the connected state is a cell in a validity area, that is, the cell on which the terminal device camps when the terminal device is released from the connected state matches the validity area, the terminal device may measure a measurement frequency corresponding to the validity area.

Figure 4:
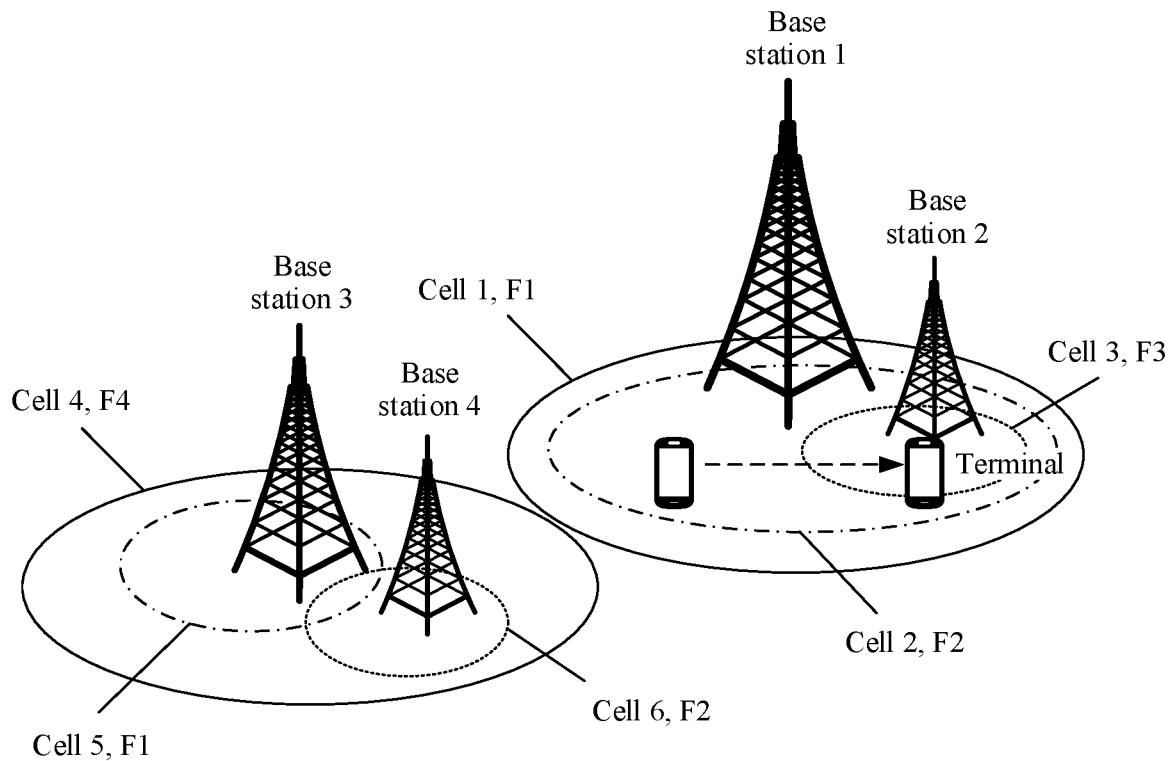
FIG. 4 is a schematic diagram of an application scenario 1 of a measurement method according to an embodiment of this application.

For example, as shown in FIG. 4, the cell on which the terminal device camps is a cell on which the terminal device camps after the terminal device performs reselection, namely, a cell 3 on a frequency F3. The terminal device may determine, based on the cell (F3, cell 3) on which the terminal device currently camps, whether the cell matches a validity area. When the cell (F3, cell 3) on which the terminal device currently camps matches the validity area, the terminal device may measure a measurement frequency corresponding to the validity area.

It may be understood that the cell on which the terminal device camps matches a first validity area, that is, the cell on which the terminal device camps corresponds to a cell included in the first validity area, or the cell on which the terminal device camps may be mapped to the first validity area. That is, one or more cells included in the first validity area include the cell on which the terminal device camps.

Optionally, the terminal device may determine, based on the first measurement configuration stored in the terminal device, whether the cell on which the terminal device currently camps matches the first validity area stored in the local variable. When the cell on which the terminal device camps matches the first validity area, the terminal device measures the first measurement frequency stored in the local variable.

Optionally, the terminal device may store a result of measurement on the first measurement frequency in the local variable.

It should be noted that in this embodiment of this application, when the terminal device measures the measurement frequency, the timer is not stopped and does not expire.

According to the measurement method provided in this embodiment of this application, the radio access network device determines the two or more measurement configurations, where each measurement configuration includes the validity area and the measurement frequency corresponding to the validity area; the radio access network device sends the timer to the terminal device; the terminal device receives and starts the timer; the radio access network device sends the two or more measurement configurations to the terminal device via the cell on which the terminal device camps; the terminal device receives the two or more measurement configurations; when the cell on which the terminal device camps matches the validity area, the terminal device measures the first measurement frequency corresponding to the validity area. According to the measurement method in this embodiment, the radio access network device can configure a plurality of measurement configurations for the terminal device, and each measurement configuration includes a validity area and a measurement frequency corresponding to the validity area. Therefore, when the cell on which the terminal device camps matches a validity area, the terminal device measures a measurement frequency corresponding to the validity area. Compared with a current technology in which a terminal device receives only one early measurement configuration, this embodiment of this application provides the measurement method in which the terminal device can receive a plurality of measurement configurations, so that the terminal device can measure, based on the plurality of measurement configurations, the measurement frequency corresponding to the validity area that matches the cell on which the terminal device camps. Therefore, validity areas can be flexibly configured, and the terminal device can quickly establish dual connectivity and/or configure carrier aggregation.

Optionally, in step S305, the terminal device may receive the two or more measurement configurations from different cells. For example, the two or more measurement configurations include a first measurement configuration and a second measurement configuration. The first measurement configuration includes a first validity area and a first measurement frequency corresponding to the first validity area. The second measurement configuration includes a second validity area and a second measurement frequency corresponding to the second validity area. Step S305 may include steps S3051 and S3052.

S3051: The terminal device receives the first measurement configuration from the first cell, where the first cell is a cell on which the terminal device camps when the terminal device is released from the connected state.

The first cell is a cell managed by a first radio access network device and/or a cell within coverage of the first radio access network device.

For example, as shown in FIG. 1, the first validity area may be {(F1, cell 1), (F2, cell 2), (F3, cell 3)}. In other words, the first validity area includes three cells, and the three cells are respectively the cell 1 on the frequency F1, the cell 2 on the frequency F2, and the cell 3 on the frequency F3. The first measurement frequency corresponding to the first validity area may be {F1, F2, F3}. That is, the first measurement frequency in the list of frequencies includes the frequency F1, the frequency F2, and the frequency F3.

For example, when the first measurement configuration is carried in the RRC signaling, the terminal device receives the RRC signaling from the first cell to obtain the first measurement configuration. When the first measurement configuration is carried in the SIB of the first cell, the terminal device receives the SIB of the first cell to obtain the first measurement configuration.

Optionally, the terminal device may store the first measurement configuration. For example, the terminal device may store the first measurement configuration in the local variable.

S3052: When the second cell reselected by the terminal device does not match the first validity area, the terminal device continues to run the timer, and the terminal device receives the second measurement configuration from the second cell.

Figure 5:
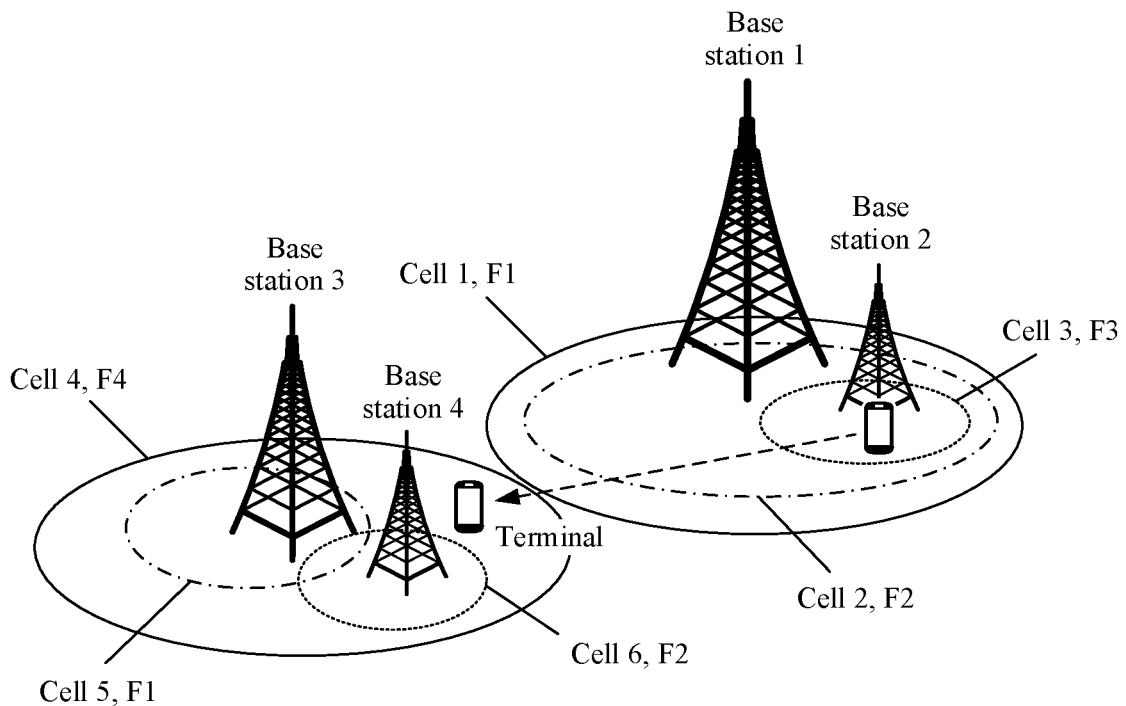
FIG. 5 is a schematic diagram of an application scenario 2 of a measurement method according to an embodiment of this application.

For example, as shown in FIG. 5, the second cell reselected by the terminal device is the cell 4 on the frequency F4. Because the first validity area includes {(F1, cell 1), (F2, cell 2), (F3, cell 3)}, that is, a list of cells in the first validity area does not include the second cell (F4, cell 4) reselected by the terminal device, the terminal device may determine that the second cell (F4, cell 4) reselected by the terminal device does not match the first validity area. The terminal device continues to run the timer, and receives the second measurement configuration from the second cell (F4, cell 4).

For example, in an implementation, when receiving the second measurement configuration, the terminal device may release the first measurement configuration stored in the local variable, and store the second measurement configuration in the local variable, that is, the terminal device updates a measurement configuration in the local variable. In this implementation, the terminal device may store a measurement configuration that is last received by the terminal device.

In another implementation, when the terminal device receives the second measurement configuration, the terminal device may store the second measurement configuration in the local variable without releasing the first measurement configuration stored in the local variable. In this implementation, the terminal device may store the first measurement configuration and a measurement configuration that is last received by the terminal device. It may be understood that, when the terminal device stores the first measurement configuration and the measurement configuration that is last received by the terminal device, the terminal device always maintains the last received measurement configuration and the first measurement configuration that is sent by a network side when the terminal device is released from the connected state. That is, the terminal device always maintains the measurement configuration that is last received by the terminal device and the first measurement configuration that is delivered by using the RRC signaling of the first cell or the SIB of the first cell.

It should be noted that this embodiment is described only by using the example in which the two or more measurement configurations include the first measurement configuration and the second measurement configuration. In actual application, the two or more measurement configurations may further include more measurement configurations. When a cell reselected by the terminal device does not match a validity area included in the measurement configuration that is last received by the terminal device, the terminal device may receive a new measurement configuration from the reselected cell.

It may be understood that in this embodiment, when the cell reselected by the terminal device does not match the validity area, the terminal device does not stop the timer (suspends early measurement), but continues to run the timer, and receives a new measurement configuration (the second measurement configuration) sent by the cell reselected by the terminal device. Compared with the current technology in which when a cell reselected by the terminal device does not match the early measurement configuration received during connection release, the terminal device stops running a timer and does not perform early measurement, this solution provides the method in which when the cell reselected by the terminal device does not match a last received validity area, a new measurement configuration is received from the reselected cell, and early measurement of the terminal device is not stopped because the terminal device continues to run the timer.

The following describes in detail the measurement method provided in this embodiment of this application with reference to a specific application scenario.

Figure 6:
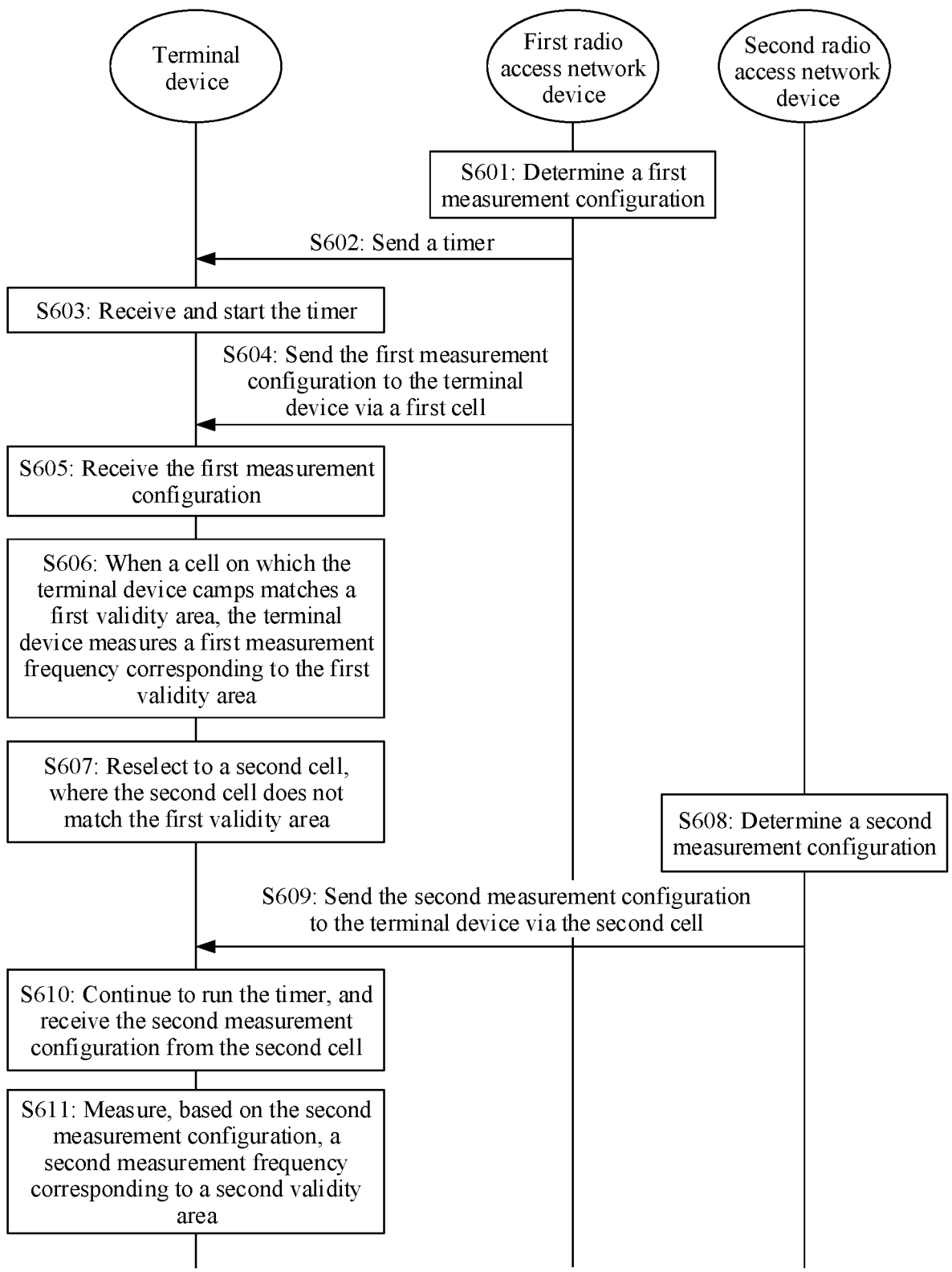
FIG. 6 is a schematic flowchart of another measurement method according to an embodiment of this application.

This application further provides an embodiment. As shown in FIG. 6, the measurement method may include steps S601 to S611.

S601: A first radio access network device determines a first measurement configuration.

As shown in FIG. 1, a first validity area in the first measurement configuration may be represented as {(F1, cell 1), (F2, cell 2), (F3, cell 3)}. In other words, the first validity area includes three cells, and the three cells are respectively the cell 1 on the frequency F1, the cell 2 on the frequency F2, and the cell 3 on the frequency F3. A first measurement frequency corresponding to the first validity area may be {F1, F2, F3}. That is, the first measurement frequency in a list of frequencies includes the frequency F1, the frequency F2, and the frequency F3.

It may be understood that for a specific implementation of step S601, refer to a specific implementation of step S301. Details are not described herein again.

S602: The first radio access network device sends a timer to a terminal device.

S603: The terminal device receives and starts the timer.

It may be understood that for specific implementations of steps S602 and S603, refer to specific implementations of steps S302 and S303. Details are not described herein again.

S604: The first radio access network device sends the first measurement configuration to the terminal device via a first cell.

The first cell is a cell on which the terminal device camps when the terminal device is released from a connected state, and the first cell is a cell managed by the first radio access network device and/or a cell within coverage of the first radio access network device. As shown in FIG. 1, when the terminal device receives an RRC connection release message, if a cell on which the terminal device camps is the cell 2 on the frequency F2, the cell 2 on the frequency F2 is the first cell. The first radio access network device may be the base station 1 in FIG. 1.

For example, the first measurement configuration may be carried in RRC signaling of the first cell together with the timer, or the first measurement configuration may be independently carried in a system information block (SIB) of the first cell. This is not limited in this embodiment of this application. For example, when the first measurement configuration is carried in the RRC signaling, because the timer is also carried in the RRC signaling, the foregoing steps S602 and S604 may be combined into one step.

It should be noted that when dedicated signaling carries the first measurement configuration, and the SIB of the first cell also carries the first measurement configuration, the terminal device uses the first measurement configuration delivered by using the dedicated signaling instead of using the first measurement configuration carried in the SIB of the first cell. That is, a priority of the first measurement configuration in the dedicated signaling is higher than a priority of the first measurement configuration in the SIB. When the dedicated signaling carries only the timer and does not carry the first measurement configuration, the terminal device may receive the SIB of the first cell to obtain the first measurement configuration.

S605: The terminal device receives the first measurement configuration from the first cell.

It may be understood that for a specific implementation of step S605, refer to a specific implementation of step S3051. Details are not described herein again.

S606: When the cell on which the terminal device camps matches the first validity area, the terminal device measures the first measurement frequency corresponding to the first validity area.

For example, as shown in FIG. 1, the cell on which the terminal device camps is the cell on which the terminal device camps when the terminal device is released from the connected state, namely, the cell 2 on the F2. Because the cell on which the terminal device camps when the terminal device is released from the connected state is a cell in the first validity area, that is, the cell on which the terminal device camps when the terminal device is released from the connected state matches the first validity area, the terminal device measures the first measurement frequency based on the first measurement configuration.

For example, as shown in FIG. 4, the cell on which the terminal device camps is a cell on which the terminal device camps after the terminal device performs reselection, namely, the cell 3 on the F3. The terminal device may determine, based on the cell (F3, cell 3) on which the terminal device currently camps, whether the cell matches the first validity area. Because the first validity area includes {(F1, cell 1), (F2, cell 2), (F3, cell 3)}, that is, a list of cells in the first validity area includes the cell (F3, cell 3) on which the terminal device currently camps, the terminal device may determine that the cell on which the terminal device currently camps matches the first validity area, and the terminal device may measure the first measurement frequency {F1, F2, F3} corresponding to the first validity area.

It may be understood that for a specific implementation of step S606, refer to a specific implementation of step S306. Details are not described herein again.

S607: The terminal device reselects to a second cell, where the second cell does not match the first validity area.

For example, as shown in FIG. 5, the second cell reselected by the terminal device is the cell 4 on the F4. Because the first validity area includes {(F1, cell 1), (F2, cell 2), (F3, cell 3)}, that is, a list of cells in the first validity area does not include the second cell (F4, cell 4) reselected by the terminal device, the terminal device may determine that the second cell (F4, cell 4) reselected by the terminal device does not match the first validity area.

It should be noted that a method used by the terminal device to reselect to the second cell is not limited in this embodiment of this application. For details, refer to a cell reselection method in mobility management in a current technology.

S608: A second radio access network device determines a second measurement configuration.

The second radio access network device and the first radio access network device may be a same radio access network device, or may be different radio access network devices. This is not limited in this embodiment of this application.

As shown in FIG. 5, a second validity area in the second measurement configuration may be {(F4, cell 4), (F1, cell 5), (F2, cell 6)}. In other words, the second validity area includes three cells, and the three cells are respectively the cell 4 on the frequency F4, the cell 5 on the frequency F1, and the cell 6 on the frequency F2. A second measurement frequency corresponding to the second validity area may be {F1, F2, F4}. That is, the second measurement frequency in the list of frequencies includes the frequency F1, the frequency F2, and the frequency F4.

Optionally, one or more cells included in the first validity area may be partially the same as one or more cells included in the second validity area. For example, a cell may belong to the first validity area, or may belong to the second validity area. Optionally, one or more cells included in the first validity area may be completely different from one or more cells included in the second validity area. For example, a cell belongs only to the first validity area, or belongs only to the second validity area.

It should be noted that a sequence of step S608 and the foregoing steps S601 to S607 is not limited in this embodiment of this application.

It may be understood that for a specific implementation of step S608, refer to a specific implementation of step S301. Details are not described herein again.

S609: The second radio access network device sends the second measurement configuration to the terminal device via a second cell.

The second measurement configuration is carried in a SIB of the second cell. The second cell is a cell managed by the second radio access network device and/or a cell within coverage of the second radio access network device. Herein, only an example in which the second radio access network device is different from the first radio access network device is used. For example, the second radio access network device may be the base station 3 in FIG. 5. As shown in FIG. 5, the base station 3 may send the second measurement configuration to the terminal device via the cell 4 on the frequency F4, where the second measurement configuration is carried in a SIB of the cell 4.

S610: The terminal device continues to run the timer, and the terminal device receives the second measurement configuration from the second cell.

It may be understood that for a specific implementation of step S610, refer to a specific implementation of step S3052. Details are not described herein again.

S611: The terminal device measures, based on the second measurement configuration, the second measurement frequency corresponding to the second validity area.

For example, the terminal device may measure the second measurement frequency based on the second measurement configuration stored in a local variable.

Optionally, the terminal device may release a result that is of measurement on the first measurement frequency and that is stored in the local variable, and store a result of measurement on the second measurement frequency in the local variable. That is, the terminal device may store a latest measurement result in the local variable. Therefore, once initiating an access process, the terminal device may report the latest measurement result to the radio access network device, so that the radio access network device can quickly establish dual connectivity and/or configure carrier aggregation based on the measurement result.

According to the measurement method in this embodiment, when the cell reselected by the terminal device does not match a validity area configured by the radio access network device when the terminal device is released from the connected state, the terminal device may continue to run the timer, receive a new measurement configuration from the reselected cell, and perform early measurement based on the new measurement configuration. Once initiating the access process, the terminal device may report an early measurement result, and the network may establish proper dual connectivity and/or configure carrier aggregation based on the received measurement result. Therefore, dual connectivity and/or configure carrier aggregation can be quickly established.

Optionally, after step S611, if the terminal device reselects to a third cell, and the third cell does not match the second validity area, the terminal device may receive a new measurement configuration (a third measurement configuration) from the third cell, store the third measurement configuration in the local variable, and measure, based on the third measurement configuration, a third measurement frequency corresponding to a third validity area. In other words, early measurement may continue to be performed according to steps S607 to S611. Details are not described herein again. It may be understood that in the solution in this embodiment, when the cell reselected by the terminal device does not match a validity area included in a measurement configuration that is last received by the terminal device, the terminal device may receive a new measurement configuration from the reselected cell, and perform early measurement based on the new measurement configuration.

Optionally, when the terminal device stores the first measurement configuration and the measurement configuration that is last received by the terminal device, after step S611, if the terminal device reselects to a fourth cell, and the fourth cell matches the first validity area, that is, the terminal device reselects to the first validity area, the terminal device may measure the first measurement frequency based on the first measurement configuration stored in the local variable. It may be understood that, when the terminal device always stores the first measurement configuration, if the terminal device reselects to an area other than the first validity area, the terminal device receives a new measurement configuration, and performs measurement based on the new measurement configuration. When the terminal device reselects to the first validity area again, because the terminal device stores the first validity area, the terminal device does not need to receive the new measurement configuration again, and may directly perform measurement based on the first measurement configuration.

Optionally, in an implementation, the validity area in steps S601 to S611 may include only the cell on which the terminal device currently camps. For example, the first validity area in step S601 may include only the first cell on which the terminal device camps when the terminal device is released from the connected state. When the terminal device reselects to the second cell from the first cell, the terminal device continues to run the timer, and receives the second measurement configuration from the second cell. The second validity area included in the second measurement configuration includes only the second cell. In this implementation, because the validity area includes only the cell on which the terminal device currently camps, once the terminal device reselects to the second cell from the first cell, the terminal device does not need to determine whether the reselected second cell matches the first validity area, and the terminal device may directly receive the new measurement configuration from the reselected second cell.

According to the measurement method provided in this embodiment of this application, the terminal device receives the first measurement configuration when the terminal device is released from the connected state, and measures the first measurement frequency based on the first measurement configuration when the cell on which the terminal device camps matches the first validity area. When the cell reselected by the terminal device does not match the first validity area, the terminal device continues to run the timer, receives the new measurement configuration from the reselected cell, and performs early measurement based on the new measurement configuration. Therefore, this embodiment of this application resolves a problem in the current technology that once the terminal device moves out of the validity area, the terminal device does not perform early measurement. In this application, validity areas can be flexibly configured. When the terminal device moves out of the validity area, the terminal device receives the new measurement configuration and performs early measurement, so that the latest measurement result can be reported to the radio access network device. Therefore, dual connectivity can be quickly established and/or carrier aggregation can be quickly configured.

Figure 7:
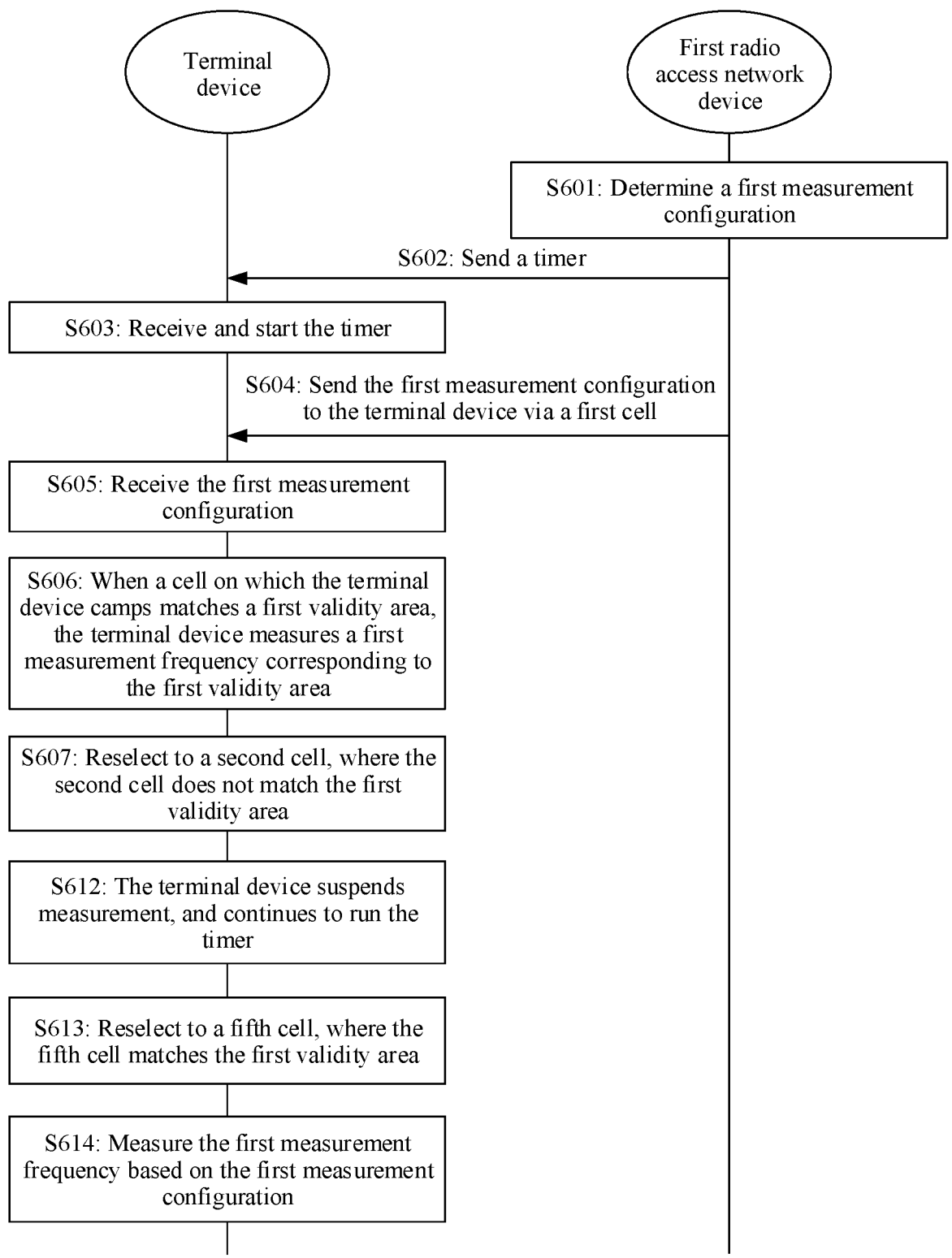
FIG. 7 is a schematic flowchart of another measurement method according to an embodiment of this application.

This application provides still another embodiment. As shown in FIG. 7, after steps S601 to S607, steps S612 to S614 may be further included.

S612: The terminal device suspends measurement, and the terminal device continues to run the timer.

For example, when the second cell reselected by the terminal device does not match the first validity area, the terminal device may suspend early measurement and continue to run the timer. Because the timer is not stopped and does not expire, early measurement is not stopped, and the terminal device does not perform early measurement temporarily.

S613: The terminal device reselects to a fifth cell, where the fifth cell matches the first validity area.

For example, the fifth cell reselected by the terminal device is the cell 2 on the frequency F2 in FIG. 5. The terminal device may determine, based on the fifth cell (F2, cell 2), whether the cell matches the first validity area included in the first measurement configuration. Because the first validity area is {(F1, cell 1), (F2, cell 2), (F3, cell 3)}, that is, a list of cells in the first validity area includes the fifth cell (F2, cell 2), the terminal device may determine that the fifth cell (F2, cell 2) matches the first validity area.

S614: The terminal device measures the first measurement frequency based on the first measurement configuration.

For example, when the terminal device reselects to the first validity area included in the first measurement configuration again, the terminal device may measure the first measurement frequency based on the first measurement configuration received when the terminal device is released from the connected state.

For example, when the terminal device reselects to the first validity area included in the first measurement configuration again, the terminal device may measure, based on the first measurement configuration received when the terminal device is released from the connected state, the first measurement frequency corresponding to the first validity area.

According to the measurement method provided in this embodiment of this application, the terminal device delivers the first measurement configuration when the terminal device is released from the connected state, where the first measurement configuration includes the first validity area and the first measurement frequency corresponding to the first validity area. When the cell on which the terminal device camps matches the first validity area, the terminal device measures the first measurement frequency. When the cell reselected by the terminal device does not match the first validity area, the terminal device suspends measurement, and the terminal device continues to run the timer. When the terminal device moves to the first validity area again, the terminal device may continue to perform early measurement based on the first measurement configuration. This embodiment of this application resolves a problem in the current technology that once the terminal device moves out of the validity area, the terminal device does not perform early measurement. In this application, early measurement can be suspended when the terminal device moves out of the validity area, and early measurement can be continued when the terminal device moves to the validity area.

Figure 8:
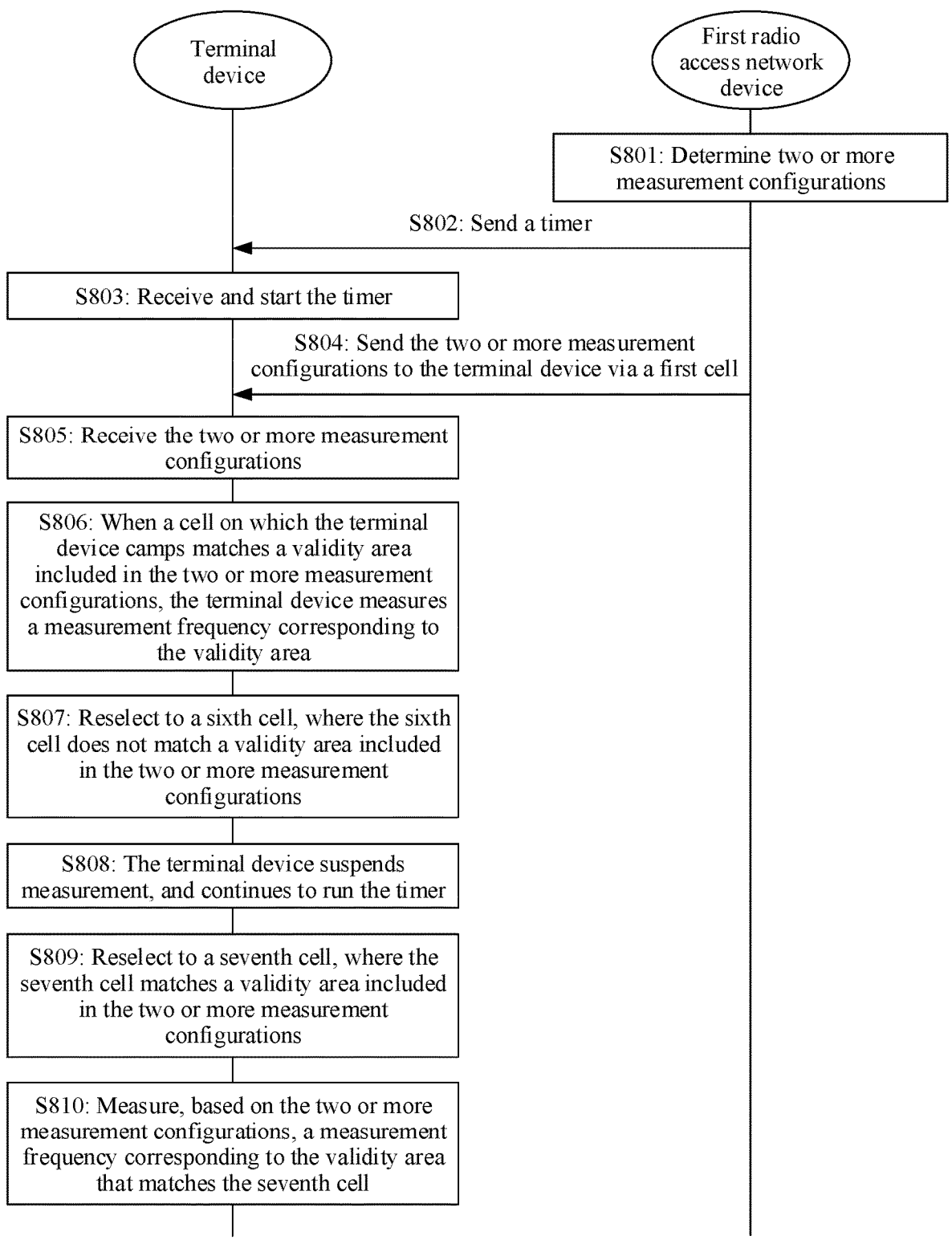
FIG. 8 is a schematic flowchart of another measurement method according to an embodiment of this application.

This application provides still another embodiment. As shown in FIG. 8, the measurement method includes steps S801 to S810.

S801: A first radio access network device determines two or more measurement configurations, where each measurement configuration includes a validity area and a measurement frequency corresponding to the validity area.

Figure 9:
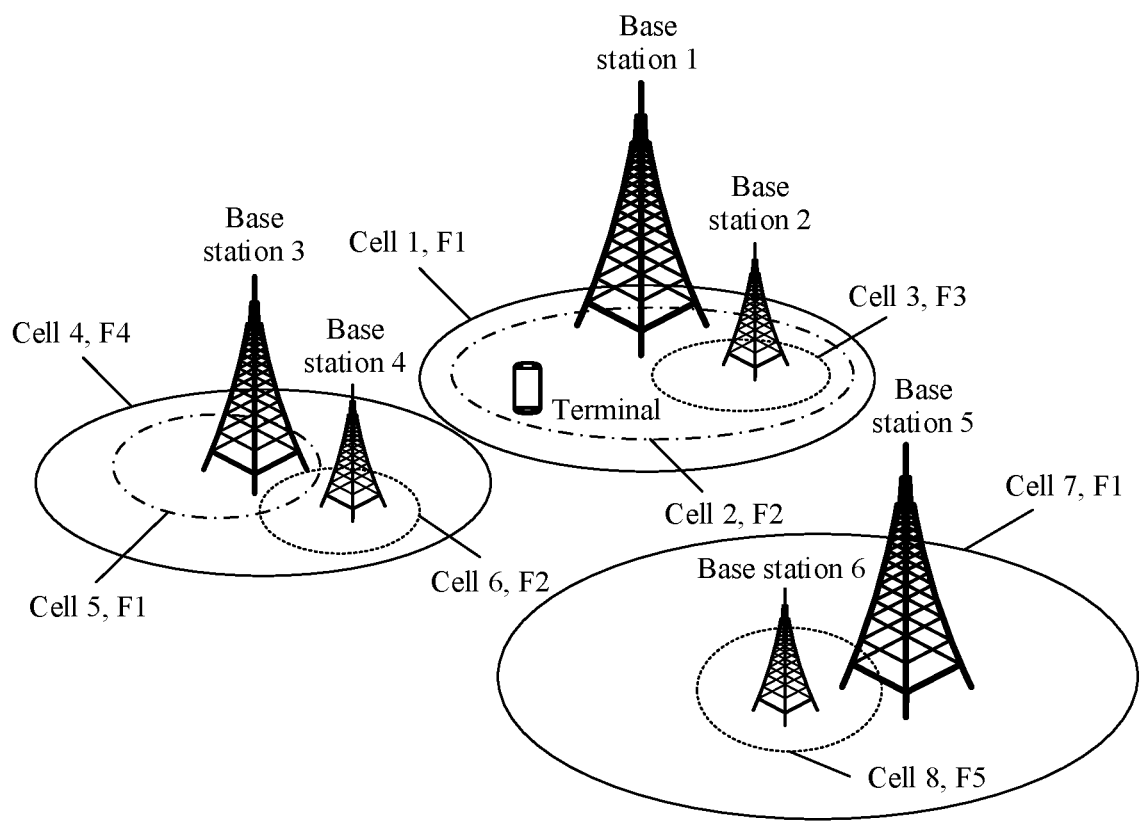
FIG. 9 is a schematic diagram of an application scenario 3 of another measurement method according to an embodiment of this application.

For example, as shown in FIG. 9, a cell 1 on a frequency F1 and a cell 2 on a frequency F2 are deployed in a base station 1. A cell 3 that is on a frequency F3 and that has small coverage is deployed in a base station 2. The base station 1 may establish a dual connection to the base station 2. A cell 4 on a frequency F4 and a cell 5 on the frequency F1 are deployed in a base station 3. A cell 6 on the frequency F2 is deployed in a base station 4. The base station 3 may establish a dual connection to the base station 4. A cell 7 on the frequency F1 is deployed in a base station 5. A cell 8 on a frequency F5 is deployed in a base station 6. The base station 5 may establish a dual connection to the base station 6. Because coverage of the base stations is different, the base station 1 cannot establish dual connections to the base stations 3, 4, 5, and 6, the base station 2 cannot establish dual connections to the base stations 3, 4, 5, and 6, the base station 3 cannot establish dual connections to the base stations 5 and 6, and the base station 4 cannot establish dual connections to the base stations 5 and 6.

For example, with reference to FIG. 9, the two or more measurement configurations may include a first measurement configuration, a second measurement configuration, and a third measurement configuration. For example, the first measurement configuration includes a first validity area and a first measurement frequency corresponding to the first validity area, where the first validity area is {(F1, cell 1), (F2, cell 2), (F3, cell 3)}, and the first measurement frequency is {F1, F2, F3}. The second measurement configuration includes a second validity area and a second measurement frequency corresponding to the second validity area, where the second validity area is {(F4, cell 4), (F1, cell 5), (F2, cell 6)}, and the second measurement frequency is {F1, F2, F4}. For example, the third measurement configuration includes a third validity area and a third measurement frequency corresponding to the third validity area, where the third validity area is {(F1, cell 7), (F5, cell 8)}, and the third measurement frequency is {F1, F5}.

It may be understood that for a specific implementation of step S801, refer to a specific implementation of step S301. Details are not described herein again.

S802: The first radio access network device sends a timer to a terminal device.

S803: The terminal device receives and starts the timer.

It may be understood that for specific implementations of steps S802 and S803, refer to specific implementations of steps S302 and S303. Details are not described herein again.

S804: The first radio access network device sends the two or more measurement configurations to the terminal device via a first cell.

The first cell is a cell on which the terminal device camps when the terminal device is released from a connected state, and the first cell is a cell managed by the first radio access network device and/or a cell within coverage of the first radio access network device. As shown in FIG. 9, when the terminal device receives an RRC connection release message, if a cell on which the terminal device camps is the cell 2 on the frequency F2, the first cell is the cell 2 on the F2. The first radio access network device may be the base station 1 in FIG. 9.

For example, the two or more measurement configurations may be carried in RRC signaling of the first cell together with the timer, or the two or more measurement configurations may be independently carried in a SIB of the first cell. This is not limited in this embodiment of this application.

S805: The terminal device receives the two or more measurement configurations from the first cell.

For example, when the two or more measurement configurations are carried in the RRC signaling, the terminal device receives the RRC signaling from the first cell to obtain the two or more measurement configurations. When the two or more measurement configurations are carried in the SIB of the first cell, the terminal device receives the SIB of the first cell to obtain the two or more measurement configurations.

Optionally, the terminal device may store the two or more measurement configurations. For example, the terminal device may store the two or more measurement configurations in a local variable.

S806: When the cell on which the terminal device camps matches a validity area included in the two or more measurement configurations, the terminal device measures a measurement frequency corresponding to the validity area For example, that the cell on which the terminal device camps matches a validity area included in the two or more measurement configurations may include: The cell on which the terminal device camps matches one validity area included in the two or more measurement configurations; or may include: The cell on which the terminal device camps matches a plurality of validity areas included in the two or more measurement configurations. This is not limited in this embodiment of this application. Only an example in which the cell on which the terminal device camps matches one validity area included in the two or more measurement configurations is used for description herein.

For example, a cell on which the terminal device currently camps is the cell 7 on the frequency F1 in FIG. 9. The terminal device may determine, based on the cell (F1, cell 7) on which the terminal device currently camps, whether the cell matches a validity area included in the two or more measurement configurations. Because the third validity area is {(F1, cell 7), (F5, cell 8)}, that is, a list of cells in the third validity area includes the cell (F1, cell 7) on which the terminal device currently camps, the terminal device may determine that the cell (F1, cell 7) on which the terminal device currently camps matches the third validity area, and the terminal device may measure the third measurement frequency {F1, F5} corresponding to the third validity area.

S807: The terminal device reselects to a sixth cell, where the sixth cell does not match a validity area included in the two or more measurement configurations.

For example, that the sixth cell does not match a validity area included in the two or more measurement configurations may include: The sixth cell matches no validity area included in the two or more measurement configurations.

Figure 10:
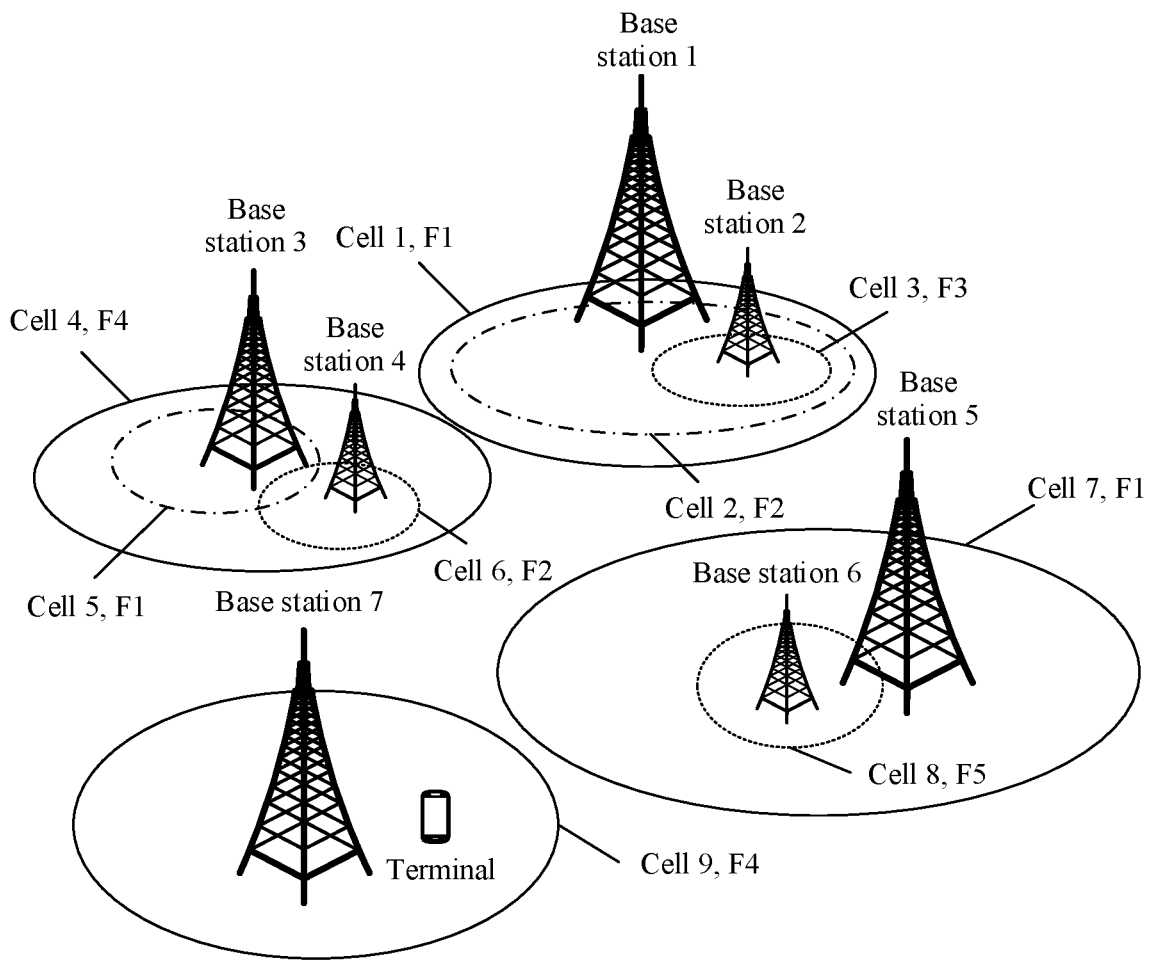
FIG. 10 is a schematic diagram of an application scenario 4 of another measurement method according to an embodiment of this application.

For example, as shown in FIG. 10, if the sixth cell reselected by the terminal device is the cell 9 on the frequency F4 in FIG. 10, because the first validity area, the second validity area, and the third validity area do not include the sixth cell, the sixth does not match the three validity areas.

S808: The terminal device suspends measurement, and the terminal device continues to run the timer.

For example, when the sixth cell reselected by the terminal device matches no validity area, the terminal device may suspend early measurement and continue to run the timer. Because the timer is not stopped and does not expire, the early measurement is not stopped. That is, when the terminal device reselects to a cell outside the validity areas included in the two or more measurement configurations, the terminal does not perform early measurement temporarily.

S809: The terminal device reselects to a seventh cell, where the seventh cell matches a validity area included in the two or more measurement configurations.

For example, the seventh cell reselected by the terminal device is the cell 6 on the frequency F2 in FIG. 10. The terminal device may determine, based on the cell (F2, cell 6) on which the terminal device currently camps, whether the cell matches a validity area included in the two or more measurement configurations. Because the second validity area is {(F4, cell 4), (F1, cell 5), (F2, cell 6)}, that is, a list of cells in the second validity area includes the cell (F2, cell 6) on which the terminal device currently camps, the terminal device may determine that the cell (F2, cell 6) on which the terminal device currently camps matches the second validity area.

S810: The terminal device measures, based on the two or more measurement configurations, a measurement frequency corresponding to the validity area that matches the seventh cell.

For example, when the terminal device reselects to a validity area included in the two or more measurement configurations again, the terminal device may measure, based on the two or more measurement configurations received when the terminal device is released from the connected state, a measurement frequency corresponding to the matched validity area.

For example, the seventh cell reselected by the terminal device is the cell 6 on the frequency F2 in FIG. 10. Because the seventh cell (F2, cell 6) matches the second validity area, the terminal device may measure the second measurement frequency corresponding to the second validity area.

It should be noted that in this embodiment of this application, when the terminal device measures the measurement frequency, the timer is not stopped and does not expire.

It may be understood that in a process of performing steps S801 to S810 in this embodiment, the terminal device always stores the two or more measurement configurations. When the terminal device moves out of the validity area included in the two or more measurement configurations, the two or more measurement configurations stored in the terminal device are not released.

According to the measurement method provided in this embodiment of this application, the radio access network device delivers the two or more measurement configurations, where each measurement configuration includes the validity area and the measurement frequency corresponding to the validity area. When the cell on which the terminal device camps matches a validity area included in the two or more measurement configurations, the terminal device measures a measurement frequency corresponding to the validity area. When the cell reselected by the terminal device does not match a validity area included in the two or more measurement configurations, the terminal device suspends measurement, and the terminal device continues to run a timer. When the terminal device moves to the validity area included in the two or more measurement configurations again, the terminal device may continue to perform early measurement based on the two or more measurement configurations. This embodiment of this application resolves a problem in a current technology that once the terminal device moves out of the validity area, the terminal device does not perform early measurement. In this application, early measurement can be suspended when the terminal device moves out of the validity area, and early measurement can be continued when the terminal device moves to the validity area.

The foregoing describes, mainly from the perspective of method steps, the solutions provided in the embodiments of this application. It may be understood that, to implement the foregoing functions, a communication device includes a hardware structure and/or a software module for performing a corresponding function. A person skilled in the art should be easily aware that, in combination with modules and algorithm steps of the examples described in the embodiments disclosed in this specification, this application can be implemented by a combination of hardware and computer software. A person skilled in the art may use different methods to implement the described functions for each particular application, but it should not be considered that the implementation goes beyond the scope of this application.

In the embodiments of this application, the communication device may be divided into function modules based on the foregoing method examples. For example, each function module may be obtained through division based on a corresponding function, or two or more functions may be integrated into one processing module. The integrated module may be implemented in a form of hardware, or may be implemented in a form of a software function module. It should be noted that module division in the embodiments of this application is an example, and is merely a logical function division. During actual implementation, another division manner may be used.

Figure 11:
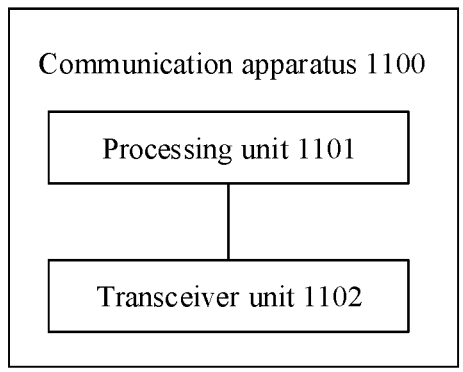
FIG. 11 is a schematic diagram of composition of a communication apparatus according to an embodiment of this application.

When each function module is obtained through division based on each corresponding function, FIG. 11 is a possible schematic diagram of a structure of a communication apparatus. The communication apparatus may be the terminal device in the foregoing embodiments or an apparatus used in the terminal, for example, a chip. The communication apparatus 1100 includes a processing unit 1101 and a transceiver unit 1102. The processing unit 1101 is configured to control and manage an action of the communication apparatus 1100. For example, the processing unit 1101 may be configured to perform step S306 in FIG. 3, or S606, S607, and S611 in FIG. 6, or S606, S607, and S612 to S614 in FIG. 7, or S806 to S810 in FIG. 8, and/or another process used in the technology described in this specification. The transceiver unit 1102 is configured to send and receive information, or is configured to communicate with another network element. For example, the transceiver unit 1102 may be configured to perform steps S303 and S305 in FIG. 3, or S603, S605, and S610 in FIG. 6, or S603 and S605 in FIG. 7, or S803 and S805 in FIG. 8, and/or another process used in the technology described in this specification. All related content of the steps in the foregoing method embodiments may be cited in function descriptions of corresponding function modules. Details are not described herein again.

Figure 12:
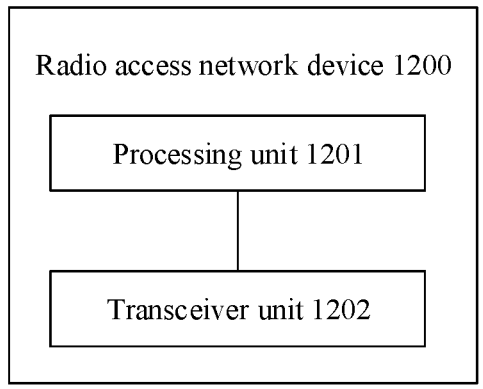
FIG. 12 is a schematic diagram of composition of a radio access network device according to an embodiment of this application.

When each function module is obtained through division based on each corresponding function, FIG. 12 is a possible schematic diagram of a structure of a radio access network device. The radio access network device may be the first radio access network device or the second radio access network device in the foregoing embodiments. The radio access network device 1200 includes a processing unit 1201 and a transceiver unit 1202. The processing unit 1201 is configured to control and manage an action of the radio access network device 1200. For example, the processing unit 1201 may be configured to perform S301 in FIG. 3, or S601 and/or S608 in FIG. 6, or S601 in FIG. 7, or S801 in FIG. 8. The transceiver unit 1202 is configured to send and receive information, or communicate with another network element. For example, the transceiver unit 1202 may be configured to perform steps S302 and S304 in FIG. 3, or S602, S604, and/or S609 in FIG. 6, or S602 and S604 in FIG. 7, or S802 and S804 in FIG. 8. All related content of the steps in the foregoing method embodiments may be cited in function descriptions of corresponding function modules. Details are not described herein again.

Figure 13:
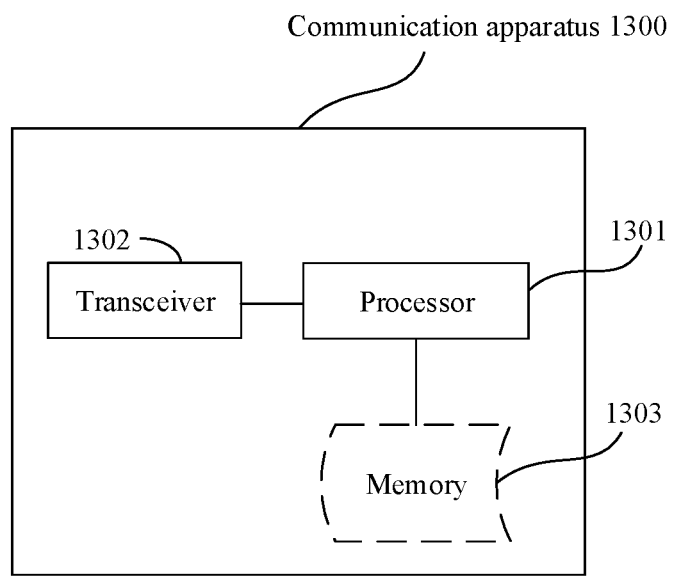
FIG. 13 is a schematic diagram of composition of another communication apparatus according to an embodiment of this application.

When an integrated unit is used, FIG. 13 is a possible schematic diagram of a structure of a communication apparatus. The communication apparatus may be the terminal device in the foregoing embodiments or an apparatus used in the terminal, for example, a chip. The communication apparatus 1300 includes a processor 1301, and may further include a transceiver 1302. The processor 1301 is configured to control and manage an action of the communication apparatus 1300. For example, the processor 1301 may be configured to perform step S306 in FIG. 3, or S606, S607, and S611 in FIG. 6, or S606, S607, and S612 to S614 in FIG. 7, or S806 to S810 in FIG. 8, and/or another process used in the technology described in this specification. The transceiver 1302 is configured to send and receive information, or is configured to communicate with another network element. For example, the transceiver 1302 is configured to perform steps S303 and S305 in FIG. 3, or S603, S605, and S610 in FIG. 6, or S603 and S605 in FIG. 7, or S803 and S805 in FIG. 8, and/or another process used in the technology described in this specification. The transceiver 1302 may be a communication interface, for example, an input/output interface. For example, when the communication apparatus 1300 is the chip, the transceiver 1302 is the communication interface. Alternatively, the transceiver 1302 may be a radio frequency unit. For example, when the communication apparatus 1300 is the terminal device, the transceiver 1302 may be the radio frequency unit connected to an antenna. Optionally, the communication apparatus 1300 may further include a memory 1303, and the memory 1303 is configured to store program code and data corresponding to any measurement method provided above and performed by the communication apparatus 1300. The memory 1303 may be a read-only memory (ROM), another type of static storage device capable of storing static information and instructions, a random access memory (RAM), or the like. The communication apparatus 1300 may be the terminal apparatus 200 shown in FIG. 2. Descriptions of all related content of the components in FIG. 2 may be cited in function descriptions of the corresponding components in FIG. 13. Details are not described herein again.

Figure 14:
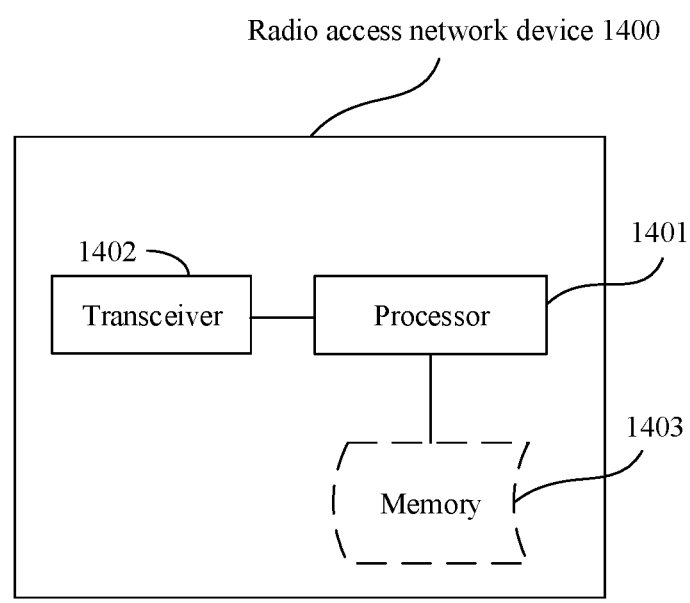
FIG. 14 is a schematic diagram of composition of another radio access network device according to an embodiment of this application.

When an integrated unit is used, FIG. 14 is a possible schematic diagram of a structure of a radio access network device. The radio access network device may be an apparatus used in the radio access network device, for example, a chip. The radio access network device 1400 includes a processor 1401, and may further include a transceiver 1402. The processor 1401 is configured to control and manage an action of the radio access network device 1400. For example, the processor 1401 may be configured to perform S301 in FIG. 3, or S601 and/or S608 in FIG. 6, or S601 in FIG. 7, or S801 in FIG. 8, and/or another process used in the technology described in this specification. The transceiver 1402 is configured to send and receive information, or is configured to communicate with another network element. For example, the transceiver 1402 may be configured to perform steps S302 and S304 in FIG. 3, or S602, S604, and S609 in FIG. 6, or S602 and S604 in FIG. 7, or S802 and S804 in FIG. 8, and/or another process used in the technology described in this specification. The transceiver 1402 may be a communication interface, for example, an input/output interface. For example, when the radio access network device 1400 is the chip, the transceiver 1402 is the communication interface. Alternatively, the transceiver 1402 may be a radio frequency unit connected to an antenna. Optionally, the radio access network device 1400 may further include a memory 1403, and the memory 1403 is configured to store program code and data corresponding to any measurement method provided above and performed by the radio access network device 1400. The memory 1403 may be a read-only memory (ROM), another type of static storage device capable of storing static information and instructions, a random access memory (RAM), or the like.

The method or algorithm steps described with reference to the content disclosed in this application may be implemented by hardware, or may be implemented by a processor by executing software instructions. The software instructions may include a corresponding software module. The software module may be stored in a random access memory (RAM), a flash memory, an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in an interface device of a core network. Certainly, the processor and the storage medium may alternatively exist in the interface device of the core network as discrete components.

A person skilled in the art should be aware that in one or more of the foregoing examples, the functions described in this application may be implemented by using hardware, software, firmware, or any combination thereof. When the functions are implemented by software, these functions may be stored in a computer-readable medium or transmitted as one or more instructions or code in the computer-readable medium. The computer-readable medium includes a computer storage medium and a communication medium, where the communication medium includes any medium that facilitates transmission of a computer program from one place to another place. The storage medium may be any available medium accessible to a general-purpose or dedicated computer.

The objectives, the technical solutions, and the benefits of this application are further described in detail in the foregoing specific implementations. It should be understood that the foregoing descriptions are merely specific implementations of this application, but are not intended to limit the protection scope of this application. Any modification, equivalent replacement or improvement made based on the technical solutions of this application shall fall within the protection scope of this application.

What is claimed is:

1. A measurement method, comprising:
   obtaining, by a terminal device, a timer;
   obtaining, by the terminal device, two or more measurement configurations, wherein each of the two or more measurement configurations comprises a validity area and a measurement frequency corresponding to the validity area, and the validity area comprises one or more cells; and
   when a cell on which the terminal device camps matches a validity area comprised in the two or more measurement configurations, measuring, by the terminal device, a measurement frequency corresponding to the validity area, wherein the terminal device is in an idle state or in an inactive state, and the timer is not stopped and has not expired, wherein measuring the measurement frequency corresponding to the validity area comprises:
      when a cell on which the terminal device currently camps does not match a validity area comprised in the two or more measurement configurations, suspending, by the terminal device, measurement, and continuing to run, by the terminal device, the timer; and
      when a fourth cell reselected by the terminal device matches a validity area comprised in the two or more measurement configurations, measuring, by the terminal device, a measurement frequency corresponding to the validity area.

2. The measurement method according to claim 1, wherein validity areas comprised in different measurement configurations do not completely overlap one another or do not partially overlap one another.

3. The measurement method according to claim 1, wherein the two or more measurement configurations comprise a first measurement configuration and a second measurement configuration, the first measurement configuration comprises a first validity area and a first measurement frequency corresponding to the first validity area, and the second measurement configuration comprises a second validity area and a second measurement frequency corresponding to the second validity area; and
   the obtaining, by the terminal device, the two or more measurement configurations comprises:
      receiving, by the terminal device, the first measurement configuration from a first cell, wherein the first cell is a cell on which the terminal device camps when the terminal device is released from a connected state; and
      when a second cell reselected by the terminal device does not match the first validity area, continuing to run, by the terminal device, the timer, and receiving, by the terminal device, the second measurement configuration from the second cell.

4. The measurement method according to claim 3, wherein the first validity area comprises the first cell, and the second validity area comprises the second cell.

5. The measurement method according to claim 3, wherein the measurement method further comprises:
   storing, by the terminal device, a measurement configuration that is last received by the terminal device; or
   storing, by the terminal device, the first measurement configuration and a measurement configuration that is last received by the terminal device.

6. The measurement method according to claim 5, wherein the measurement method further comprises:
   when the terminal device stores the first measurement configuration, and a third cell reselected by the terminal device matches the first validity area, measuring, by the terminal device, the first measurement frequency based on the first measurement configuration.

7. The measurement method according to claim 3, wherein the first measurement configuration is carried in radio resource control (RRC) signaling or a system information block (SIB) of the first cell, and the second measurement configuration is carried in a SIB of the second cell.

8. The measurement method according to claim 1, wherein the obtaining, by the terminal device, the two or more measurement configurations comprises:
   receiving, by the terminal device, the two or more measurement configurations from a first cell, wherein the first cell is a cell on which the terminal device camps when the terminal device is released from a connected state.

9. A communications apparatus, comprising:
   at least one processor;
   one or more memories interoperably coupled with the at least one processor and having tangible, non-transitory, machine-readable media storing instructions that, when executed by the at least one processor, cause the communications apparatus to:
   obtain a timer;
   obtain two or more measurement configurations, wherein each of the two or more measurement configurations comprises a validity area and a measurement frequency corresponding to the validity area, and the validity area comprises one or more cells; and
   when a cell on which the communications apparatus camps matches a validity area comprised in the two or more measurement configurations, measure the measurement frequency corresponding to the validity area, wherein the communications apparatus is in an idle state or in an inactive state, and the timer is not stopped and does not expire, wherein measuring the measurement frequency corresponding to the validity area comprises:
      when a cell on which the terminal device currently camps does not match a validity area comprised in the two or more measurement configurations, suspending measurement, and continuing to run the timer; and
      when a fourth cell reselected by the communications apparatus matches a validity area comprised in the two or more measurement configurations, measuring a measurement frequency corresponding to the validity area.

10. The communications apparatus according to claim 9, wherein validity areas comprised in different measurement configurations do not completely overlap one another or do not partially overlap one another.

11. The communications apparatus according to claim 9, wherein the two or more measurement configurations comprise a first measurement configuration and a second measurement configuration, the first measurement configuration comprises a first validity area and a first measurement frequency corresponding to the first validity area, and the second measurement configuration comprises a second validity area and a second measurement frequency corresponding to the second validity area; and
   to obtain the two or more measurement configurations, the instructions, when executed by the at least one processor, cause the communications apparatus to:
      receive the first measurement configuration from a first cell, wherein the first cell is a cell on which the communications apparatus camps when the communications apparatus is released from a connected state; and
      when a second cell reselected by the communications apparatus does not match the first validity area, continue to run the timer, and receive the second measurement configuration from the second cell.

12. The communications apparatus according to claim 11, wherein the first validity area comprises the first cell, and the second validity area comprises the second cell.

13. The communications apparatus according to claim 11, wherein the one or more memories are further configured to:
   store a measurement configuration that is last received by the communications apparatus; or
   store the first measurement configuration and a measurement configuration that is last received by the communications apparatus.

14. The communications apparatus according to claim 13, wherein the instructions, when executed by the at least one processor, cause the communication apparatus to:
   when the communications apparatus stores the first measurement configuration, and when a third cell reselected by the communications apparatus matches the first validity area, measure the first measurement frequency based on the first measurement configuration.

15. The communications apparatus according to claim 11, wherein the first measurement configuration is carried in radio resource control (RRC) signaling or a system information block (SIB) of the first cell, and the second measurement configuration is carried in a SIB of the second cell.

16. The communications apparatus according to claim 9, wherein to obtain the two or more measurement configurations, the instructions, when executed by the at least one processor, cause the communications apparatus to:
   receive the two or more measurement configurations from a first cell, wherein the first cell is a cell on which the communications apparatus camps when the communications apparatus is released from a connected state.

17. A communications apparatus, comprising:
   at least one processor; and
   a one or more memories interoperably coupled with the at least one processor and having tangible, non-transitory, machine-readable media storing instructions that, when executed by the at least one processor, cause the communications apparatus to:
      determine two or more measurement configurations, wherein each of the two or more measurement configurations comprises a validity area and a measurement frequency corresponding to the validity area, and the validity area comprises one or more cells, and wherein the two or more measurement configurations comprise a first measurement configuration and a second measurement configuration, the first measurement configuration comprises a first validity area and a first measurement frequency corresponding to the first validity area, and the second measurement configuration comprises a second validity area and a second measurement frequency corresponding to the second validity area;

send a timer to a terminal device; and send the two or more measurement configurations to the terminal device via a cell on which the terminal device camps, wherein sending the two or more measurement configurations to the terminal device comprises:

sending the first measurement configuration to the terminal device via a first cell, wherein the first cell is a cell on which the terminal device camps when the terminal device is released from a connected state; and sending the second measurement configuration to the terminal device via a second cell, wherein the second cell does not match the first validity area, and the second cell matches the second validity area.

\* \* \* \* \*